US010520300B2

(12) United States Patent
MacLean et al.

(10) Patent No.: US 10,520,300 B2
(45) Date of Patent: Dec. 31, 2019

(54) OPTICAL LIQUID LEVEL MEASUREMENT SYSTEM FOR DISPENSING APPARATUS

(71) Applicant: A.C. Dispensing Equipment Inc., Lower Sackville (CA)

(72) Inventors: Ian MacLean, Fall River (CA); Daniel Cantin, Quebec (CA); Anthony Alkins, Lower Sackville (CA); Derek Cole, Lower Sackville (CA); P. Gregory Erman, Head of Chezzetcook (CA); Michael Rankin, Lower Sackville (CA); Brian Gay, Enfield (CA); Kenneth MacGillivary, Oakfield (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 0 days.

(21) Appl. No.: 15/982,377

(22) Filed: May 17, 2018

(65) Prior Publication Data
US 2018/0335297 A1   Nov. 22, 2018

Related U.S. Application Data

(60) Provisional application No. 62/507,610, filed on May 17, 2017.

(51) Int. Cl.
*G01B 11/22* (2006.01)
*G01J 1/44* (2006.01)
(Continued)

(52) U.S. Cl.
CPC ............ *G01B 11/22* (2013.01); *G01F 23/292* (2013.01); *G01F 25/0061* (2013.01);
(Continued)

(58) Field of Classification Search
CPC .. G01B 11/22; G01F 23/00; G01J 1/44; G01J 2001/444; G01V 8/20
(Continued)

(56) References Cited

U.S. PATENT DOCUMENTS 4,733,095 A   3/1988   Kurahashi et al.
4,857,894 A   8/1989   Dahl
(Continued)

FOREIGN PATENT DOCUMENTS

WO    9920983 A2    4/1999
WO    2004036154 A1   4/2004

OTHER PUBLICATIONS

Happich., "Non-Contact Fluid Sensors Detect Clear and Opaque Liquids," Jun. 2011, 2 pages. Retrived from the Internet [URL: http://www.electronics-eetimes.com/news/non-contact-fluid-sensors-detect-clear-and-opaque-liquids].

*Primary Examiner* — Tri T Ton
(74) *Attorney, Agent, or Firm* — Borden Ladner Gervais LLP; Shin Hung

(57) ABSTRACT

An optical liquid height determination system of the present embodiments includes light sensors capturing different amounts of light, based on level of liquid in the tank that blocks or limits light to particular sensors. The tank is enclosed in a container with a light source and the light sensors are installed on walls of the container. Light emitted by the light source is transmitted to the light sensors by passing through the liquid product, scattered, diffused, diffracted or reflected by the dairy product, through the tank walls which may be transparent or translucent, or from other surfaces in the container within which the tank is enclosed by. The set of electrical signals received from all the light sensors are compared against sets of calibrated signals corresponding to known liquid levels in the tank. The known
(Continued)

height corresponding to the nearest set of calibrated signals is determined as the measured liquid height in the tank.

22 Claims, 14 Drawing Sheets

(51) Int. Cl.
  *G01V 8/20* (2006.01)
  *G01F 25/00* (2006.01)
  *G01F 23/292* (2006.01)
  *G01J 1/16* (2006.01)

(52) U.S. Cl.
  CPC ............... *G01J 1/1626* (2013.01); *G01J 1/44* (2013.01); *G01V 8/20* (2013.01); *G01J 2001/444* (2013.01)

(58) Field of Classification Search
  USPC .................................................. 356/601–640
  See application file for complete search history.

(56) References Cited

U.S. PATENT DOCUMENTS

| | | |
|---|---|---|
| 5,073,720 A | 12/1991 | Brown |
| 6,226,081 B1 | 5/2001 | Fantone et al. |
| 6,761,284 B2 | 7/2004 | Knepler |
| 6,949,758 B2 | 9/2005 | Shi et al. |
| 6,993,176 B2 | 1/2006 | Yamagishi et al. |
| 7,161,165 B2 | 1/2007 | Wirthlin |
| 7,234,787 B2 | 6/2007 | Grady et al. |
| 7,545,517 B2 * | 6/2009 | Rueb ........................ B25H 7/00 356/614 |
| 9,157,782 B2 | 10/2015 | Berberich et al. |
| 9,322,773 B2 | 4/2016 | Coates et al. |
| 2004/0021100 A1 * | 2/2004 | Gouzman ........... G01F 23/2927 250/573 |
| 2008/0250869 A1 * | 10/2008 | Breed ..................... B60C 11/24 73/861.27 |
| 2010/0134303 A1 * | 6/2010 | Perkins .................. A61M 5/14 340/619 |
| 2015/0160252 A1 * | 6/2015 | Murakami ......... G01N 35/1016 435/287.2 |
| 2015/0253173 A1 | 9/2015 | Cedulf et al. |
| 2016/0039329 A1 | 2/2016 | Sorensen |

* cited by examiner

OPTICAL LIQUID LEVEL MEASUREMENT SYSTEM FOR DISPENSING APPARATUS

CROSS REFERENCE TO RELATED APPLICATIONS

This application claims the benefit of priority of U.S. Provisional Patent Application No. 62/507,610 filed May 17, 2017, which is hereby incorporated by reference.

FIELD

The present disclosure relates generally to liquid dispensing systems. More particularly, the present disclosure relates to liquid tank level determination for liquid dispensing systems.

BACKGROUND

In gravity aided liquid dispensing systems, such as for dispensing dairy products, the pressure (referred to as head pressure) of the liquid over the dispensing valve at the bottom of the tank changes with the liquid column height. Accordingly, the rate of flow of liquid through the dispensing changes as the head pressure decreases. Those skilled in the art should understand there are well known mathematical calculations which can be made to determine how much time is required to dispense via gravity, an approximate volume of a liquid having known properties from a tank of known dimensions through an outlet of known dimensions, when a weight or height level of the liquid in the tank is known. Therefore having knowledge of the liquid level allows for adjustment of the opening time of the valve to obtain a substantially constant volume of dispensed dairy product.

In certain applications, such as dairy dispensing for coffee consumption, it is necessary to dispense predetermined volumes, or shots, of dairy product for consistent user taste experience, where different predetermined volumes of dairy product can be selected for dispensing. Hence, accuracy in determining the liquid level in the tank is critical for ensuring consistent volumes of the dairy product are dispensed as the tank drains. It is well-known that the flow rate of liquid through an outlet via gravity changes as the head pressure changes due to the drop in liquid in the tank.

Currently known solutions for determining the level of liquid in a tank include the use of one or more load cells or pressure sensors to measure the weight of the tank and its content to assess the pressure caused by the liquid on the dispensing valve at the front of the dispenser, as disclosed in U.S. Pat. No. 8,534,497. There are several disadvantages to using load cells in such an application when it comes to weighing the tank and its content. For example, the calibration of the load cells may need to take into account temperature, as the liquid to be dispensed can be refrigerated, warm, or left at ambient temperature. Accumulation of residual product on the walls of the tank will adversely affect the measurements, and correction is required if measurements are performed at the back of the dispenser and if the tank bottom is slightly inclined toward the front of the dispenser, and/or if the dispenser itself is not at level.

Other issues can include variability of tank weight when they are changed, which can affect the calibration and may require a zero point setting operation. Converting from mass to liquid column height can induce errors as well, based on potential inconsistent geometry of the liquid container caused by production variances, aging, or future design changes. Converting from mass to liquid column height also introduces potential errors and the complexity of having to consider the specific gravity of the liquid.

Hence, optical based liquid level detection systems have been proposed. Some known optical liquid level detection systems require immersion of the detector itself into the liquid of the tank, which is highly undesirable and sometimes not permitted in applications where the stored liquid is to be consumed as contamination of the liquid can occur if the detector is not properly cleaned. The use of photodiodes affixed to the dairy container to sense ambient light or light from light sources such as LED and laser diode have also been proposed. There are multiple drawbacks to such known optical liquid level detection systems.

FIG. 1 shows an optical liquid height determining system of the prior art. In FIG. 1, a tank 10 is shown from a front end view, and is generally rectangular in shape to hold liquid inside. The tank 10 has a top 12 which can be covered to prevent contaminants from entering the stored liquid. Extending from a bottom of tank 10 is an outlet nozzle 14 that allows liquid to flow out via gravity. While not shown, outlet nozzle 14 can be connected to a valve that controls the flow of liquid. Affixed to the side wall 16 is an array of light sensors such as photodiodes 18, of which only one is numbered. The photodiodes 18 are generally arrayed in a vertical direction along the side wall 16 such that each photodiode 18 is positioned at a different known height of the tank. Affixed to the opposite side wall 20 is an array of light sources 22, of which only one is numbered. There can be any number of light sources 22 attached to the side wall 20, provided each of the photodiodes 18 can receive a sufficient amount of light when the liquid drops below its particular level. In operation, the photodiodes 18 and the light sources 22 are turned on to determine the height of the liquid surface 24.

The principle of operation is as follows. Any photodiode 18 above the liquid surface 24 will detect an amount of light, and thereby generate a corresponding electrical signal indicating the absence of liquid at that particular photodiode 18. Any photodiode 18 below the liquid surface 24 will receive an amount of light below said threshold, and thereby generate a corresponding electrical signal that will be less than a photodiode 18 above the liquid surface 24. These signals can then be analyzed by a preprogrammed controller or microcontroller. Therefore, actual height of the liquid surface 24 in the tank 10 can be estimated by identifying the first photodiode 18 from the bottom of the tank 10 generating an electrical signal greater than the other photodiodes 18 below the liquid surface 24. Alternately, each photodiode 18 can simply generate an electrical signal when the amount of light it detects exceeds a specific threshold, and does not generate any signal in the amount of light it detects is below said specific threshold.

Accordingly, this can be seen as a "digital" liquid height determination system as multiple detectors (over two dozen) are needed to reach accuracy below 1 cm over a 30 cm liquid level range, as each detector simply determines the presence or absence of sufficient light at its height level. Therefore the resolution of the liquid height determination is limited to the spacing between detectors, which increases the component costs and data acquisition complexity. Furthermore in such systems, the tank needs to be modified to fix the detectors and light sources to its walls. This needs to be performed for every tank to be used in a dispenser including replacement tanks that are used when performing cleaning of the tank. This increases the cost of each tank and necessitates connection and disconnection of wires to communicate data signals and power. Hence this introduces the possibility of failures due to damaged connectors or improperly attached connectors. Additionally, due to the direct attachment of the detectors and light sources to the tank walls, such threshold based light detection leads to the problem where residues forming on the wall surface can provide a false positive output by blocking sufficient light from being detected by the adjacent photodiode, thereby "fooling" it into providing an incorrect output when the actual liquid level has dropped to a lower level.

Furthermore, light sources affixed to the walls of the tank will increase the wall temperature from heat dissipation, and thereby increase the probability of bacterial growth and possible contamination of dairy product stored in the tank. In the case where non-dairy products are stored in the tank, refrigeration of the product may still be desired. Unfortunately, the temperature dependent response of photodiode emitters and detectors could be impacted by the liquid level that will be at a different temperature than ambient temperature, thereby inducing a difference between detectors by up to 10° C. As any person skilled in the art would appreciate, such variation introduces calibration complexity which if not done properly, will result in an accurate dispenses of the liquid.

It is, therefore, desirable to provide a liquid level determination system that provides consistent and accurate measurements for any type of liquid and at any temperature without the problems of prior systems as noted above, and at low cost.

SUMMARY

The optical liquid height determination system of the present embodiments includes light sensors capturing different amounts of light, based on level of liquid in the tank that blocks or limits light to particular sensors. The tank is enclosed in a container with a light source and the light sensors are installed in or on the container, and not on the tank in order to avoid a sharp gradient of signal response by any one sensor in response to small changes in tank level, as well as not having to electrically connect the tank to the dispenser. Each sensor exhibits a specific response based on its height position in the container and tank liquid level.

By using calibration measurements across the sensors for every discrete calibrated level of the tank and the "in-use" measurements from the sensors, a set of calculations can be executed for each discrete calibrated level to identify a value that is closest to one of the calibrated levels.

According to a first aspect, the present invention provides a liquid height measuring system. The system includes a translucent tank with or without a covering lid, a container, a light source, at least two light sensors and a processing device. The translucent tank stores a specific liquid, and has a port for dispensing the specific liquid. The container defines a compartment to enclose the tank. The light source is attached to a first inner wall of the enclosure. The at least two light sensors are attached to a second inner wall of the compartment and proximate to a wall of the tank for generating respective electrical signals in response to the received light, where the specific liquid blocks or attenuates light from the light source reaching the at least two light sensors. The processing device receives the electrical signals and is configured to execute calculations for determining an approximate height of the specific liquid in the tank based on predetermined calibration data.

In one embodiment of the first aspect, the processing device is configured to store a calibrated value corresponding to the at least two light sensors for each predetermined discrete liquid height, execute the calculations based on the electrical signals from each of the at least two light sensors to provide a measured value, and determine the calibrated value for one of the discrete liquid heights that is nearest to the measured value.

In other embodiments of the first aspect, the light source is an infrared light source, and the at least two light sensors are infrared light sensors. Furthermore, one of the at least two light sensors is a reference sensor that is never blocked from the light source by liquid in the tank.

According to a second aspect, the present invention provides a method for approximating liquid height in a tank in a container using at least two light sensors arranged along a vertical direction of the container proximate the tank and prestored sets of calibrated signal values of the light sensors corresponding to known discrete levels of the liquid height. The method includes activating a light source within the container; generating an electrical signal value from each of the light sensors to form a set of measured electrical signal values; accessing the prestored sets of calibrated signal values from a memory, where each prestored set of calibrated signal values includes a calibrated signal value for each of the at least two light sensors corresponding to one discrete level of the liquid height; executing mathematical calculations on the set of measured electrical signal values and the prestored sets of calibrated signal values to determine one prestored set of calibrated values nearest to the set of measured electrical signal values; and outputting a discrete level of the liquid height corresponding to the one prestored set of calibrated values as the approximate liquid height in the tank.

According to a second aspect, the present invention provides a liquid height measuring system. The liquid height measuring system includes a tank, a container, a light source, at least two light sensors, a memory and a processing system. The tank has light permeable side walls and a light permeable lid for storing a specific liquid, and has a port for dispensing the specific liquid. The container is sized and shaped to enclose the tank. The light source is attached to a ceiling of the container for emitting light towards the tank. The at least two light sensors are positioned on a side wall of the container along a vertical direction and proximate to the side wall. The at least two light sensors each sense an intensity of light and each generate a corresponding electrical signal value to form a set of measured electrical signal values. The memory stores sets of calibrated signal values and corresponding known levels of the liquid height, where each set of calibrated signal values includes a calibrated signal value for each of the at least two light sensors, corresponding to one of the known levels of the liquid height. The processing system receives the set of measured electrical signal values and is configured to execute mathematical calculations for determining one set of calibrated signal values nearest to the set of measured electrical signal values. The processing system is further configured to output a discrete level of the liquid height corresponding to the one set of calibrated signal values.

Other aspects and features of the present disclosure will become apparent to those ordinarily skilled in the art upon review of the following description of specific embodiments in conjunction with the accompanying figures.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
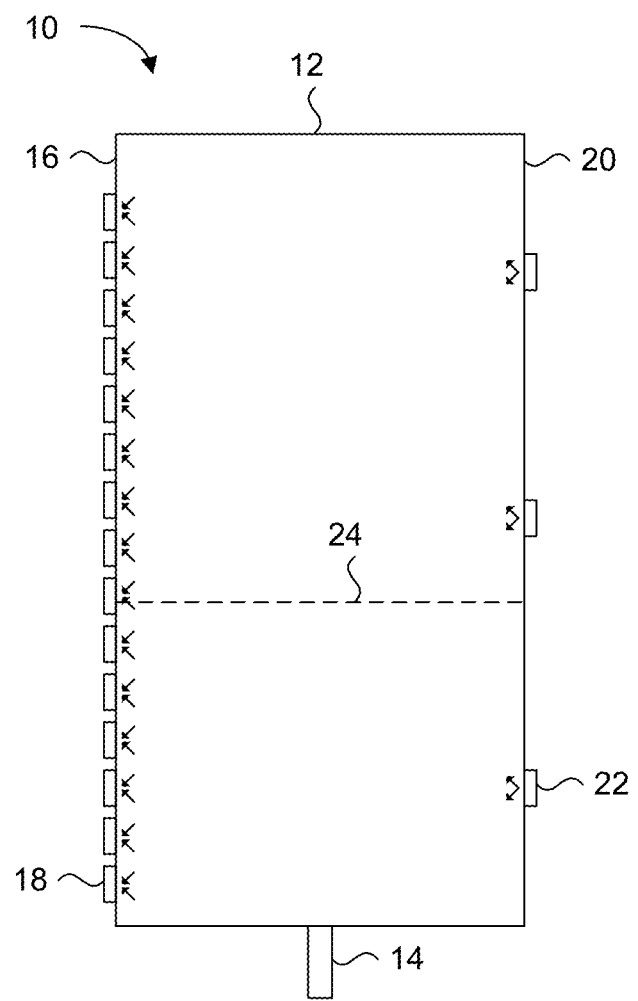
FIG. 1 shows an optical liquid height determining system of the prior art.

Generally, the present disclosure provides a method and system for optical liquid level determination in a dispensing apparatus having a container that encloses a tank. The present embodiments of the optical liquid level determination system are based on a light source, such as an LED (light emitting diode), that is positioned above the tank cover, and of light sensors that are positioned on the dispenser wall facing the tank. Light emitted by the light source is transmitted to the light sensors by passing through the liquid product, scattered, diffused, diffracted or reflected by the dairy product, through the tank walls which may be transparent or translucent, or from other surfaces in the container within which the tank is enclosed by. These can be generally referred to as light intervening mediums, all of which can vary the intensity of light that is ultimately detected by the light sensors. All the light sensors concurrently sense light they respectively receive, and each light sensor generates an analog electrical signal corresponding to the intensity or amount of light it receives. The electrical signals received from all the light sensors are used to determine the approximate level of liquid in the tank.

A calibration specific to each liquid product and tank configuration is executed before use for each discrete liquid height level of the tank. This calibration takes into account differences in the light interrupting mediums due to different types of liquid products and tank configurations, and therefore establishes calibrated signal values by each light sensor for the discrete levels of specific liquid in the tank and type of tank. In particular, for each discrete level of liquid in the tank, there will be one set of calibrated signal values corresponding to the light sensors. The presently described embodiments can be used to detect the height of various types of liquids in the tank, from water to dairy products as well as other liquids which may be substantially opaque. Therefore, multiple sets of calibrated signal values are obtained from this calibration process. A unique data processing approach is used to obtain the proper assessment of the liquid level from the set of measured light sensor signals and the sets of calibrated signal values when the dispensing apparatus is in use.

It is noted that some light interrupting mediums, such as the translucent walls of the tank and the liquid product in the tank, will reduce the intensity of light emitted by the light source. Other light interrupting mediums, such as a stainless steel inner wall of the container that houses the tank, will reflect additional light from the light source to the detectors. It is generally desirable to mitigate additional reflections from the walls of the container, therefore the reflectivity of the side wall material can be changed to obtain this desired result. For example, the inner side walls of the container can be made of or covered in black matte plastic material. In some circumstances, even air can act as a light intervening medium especially if it contains particulate matter.

Figure 2:
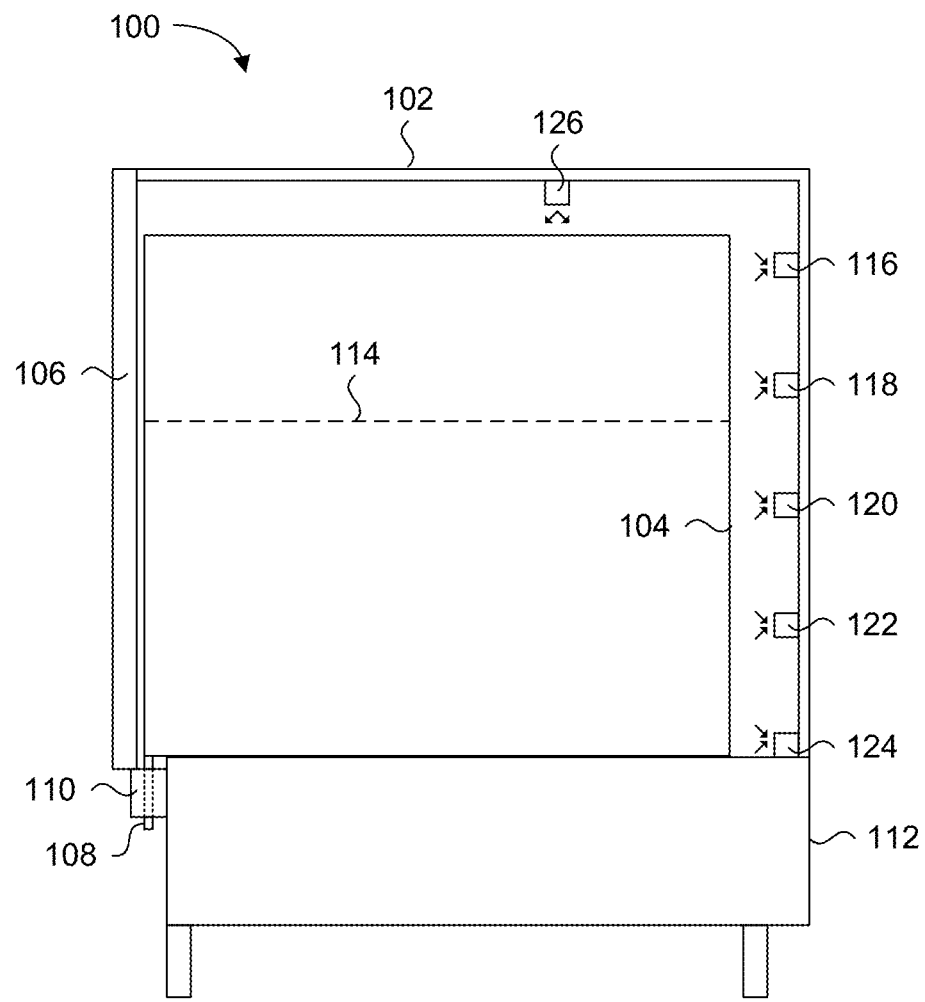
FIG. 2 shows a liquid dispensing apparatus with an integrated optical liquid height measuring system, according to a present embodiment.

FIG. 2 is a diagram showing a liquid dispensing apparatus with an integrated optical liquid height measuring system, according to a present embodiment. More specifically, FIG. 2 shows a side view of a liquid dispensing apparatus 100 having a container 102 for storing a removable tank 104. The container 102 is configured to prevent all external light from entering, however for the purposes of illustration in FIG. 2, a side wall has been omitted to show the components inside the container 102.

Generally, the container 102 takes on the overall shape of a rectangular box, and includes a front door panel 106 which can be opened to allow for insertion and removal of tank 104. Although not shown in FIG. 2, the tank 104 can be slightly tilted towards the front door panel 106. The tank 104 includes an outlet nozzle 108 coupled to a dispense control system 110 that is mounted to the dispenser chassis 112. The dispenser chassis 112 may include legs/feet which can be individually adjusted to level the liquid dispensing apparatus 100 if the surface it sits on is not level. In this example of FIG. 2, the dispense control system 110 includes a pinch valve for closing and opening the outlet nozzle 108. While not shown in FIG. 2, at least one tank stop can be included on the inside panels (top left and right side panels) of container 102 to prevent the tank from sliding all the way to the rear panel of container 102, thereby maintaining a predetermined spacing with the light sensors 116-124.

Optionally, a top panel of container 106 can be hinged to form another door to allow top side access to the inside of container 102. It is noted that liquid storage tank 104 can have translucent or transparent walls and lid, and the dashed line 114 represents an example location of the liquid surface within tank 104 either before or after a dispensing operation has occurred.

The liquid height measuring system of the liquid dispensing apparatus 100 is now described. The liquid height measuring system of the present embodiments includes a set of light sensors 116, 118, 120, 122 and 124, a light source 126, and a processing system (not shown) which can be integrated into the front door panel 106 or at any other location of the liquid dispensing apparatus 100. The processing system can include a microcontroller, a microprocessor, or any assembly of circuit devices interconnected and configured for the purposes of receiving the light sensor signals and using them to calculate the height of the liquid in the tank.

In the present example of FIG. 2, the light sensors 116, 118, 120, 122 and 124 are attached to an inner surface of a rear panel of the container 102 having their sensor faces directed towards the tank 104. In the figures, the light sensors 116, 118, 120, 122 and 124 are shown with arrowheads pointed towards them which represents the receipt of light, whereas the light source 126 is shown with arrowheads pointed away from it which represents the emitting of light. These annotations are used consistently throughout the drawings. The light source 126 is attached to an inner surface of a top panel or ceiling of container 102 and is configured to direct emitted light down towards tank 104. While a single light source 126 is shown in the embodiment of FIG. 2, additional light sources can be installed upon one or both of the sidewalls of the container 102. These additional light sources can be positioned at about the same height of light source 126 and at about the same distance from the light sensors, but directed to emit light towards the sidewall(s) of the tank 104.

While not shown in FIG. 2, the front door panel 106 includes a user interface system which can include a display to provide information, a user input panel for selecting dispense volumes and to execute other functions. As previously mentioned, the processing system can be included in the front door panel 106 to control the dispense control system 110 in view of selections made on the user interface system and to calculate a level of the liquid in the tank 104 before or after a dispense operation. The display can be configured to always show a current level of the tank 104 after the previous dispense operation.

In the event that the front door panel 106 is opened for any reason, such as for refilling the tank 104 with the same liquid or to conduct simple maintenance, closing the door panel can automatically trigger a reset operation for the liquid height measuring system to activate and determine the level of the liquid in the tank 104. This can be a beneficial function as it should be assumed in all cases that the tank 104 has been manually topped up with more of the same liquid and obviates the need for any user judgment to determine that a reset is required. Persons skilled in the art will understand any type of door sensor can easily be integrated with the processing system to provide this type of control. There may also be a manual dispense function that allows for any amount of liquid to be dispensed, where the liquid height measuring system is activated after the manual dispense operation has ended.

In a simplified manner of operation, after a manual reset or door closing triggered reset, the liquid height measuring system activates to turn on the light source 126 for a first period of time $t_{L\_ON}$. Concurrent with turning on the light source 126, all the light sensors 114-124 are turned on for a second period of time $t_{S\_ON}$. The selection of the duration of $t_{L\_ON}$ and $t_{S\_ON}$ should be at least the maximum response time of the light sensors. In one variation of this operation, the light source 126 can be turned on first, then followed by turning on of the light sensors 114-124 after a predetermined delay (Delay A). This would allow time for the light source 126 to stabilize its emitted light intensity. Hence $t_{L\_ON}$=Delay A+$t_{S\_ON}$. In another variation of this operation, both the light source 126 and the light sensors 114-124 are turned on concurrently, but sampling and processing of the electrical signals from the light sensors 114-124 only occurs after a predetermined delay (Delay B). Similarly, this allows for stabilization of the light source 126 and of the light sensors 114-124. In this situation, $t_{L\_ON}$=$t_{S\_ON}$=Delay B+$t_{S\_ON}$.

In all the variations described above, the electrical signals from each of the light sensors 114-124 are provided to the processing system for the calculation of the initial level of liquid in the tank. As will be discussed in further detail later, the processing system takes the set of measured light sensor values to identify the nearest set of calibrated signal values which corresponds to a known liquid level.

The determined liquid level is further used to calculate the time periods for opening and closing a valve of the dispense control system 110 for dispensing preselected amounts of liquid. This level can be displayed on the user interface to indicate that the liquid dispensing apparatus 100 is now ready to dispense either alone or in conjunction with some other visual indicator. Now after each dispense operation, the liquid height measuring system can be activated as described previously above. An "empty" threshold can be set in the processing system to indicate on the user interface when the liquid level in the tank has dropped to below a level in which further reliably accurate dispenses are no longer possible. Other similar predetermined threshold can also be set in the processing system Prior to a detailed discussion of the embodiments for calculation of the liquid height level, some further alternate configurations of the liquid dispensing apparatus 100 are described.

Figure 3:
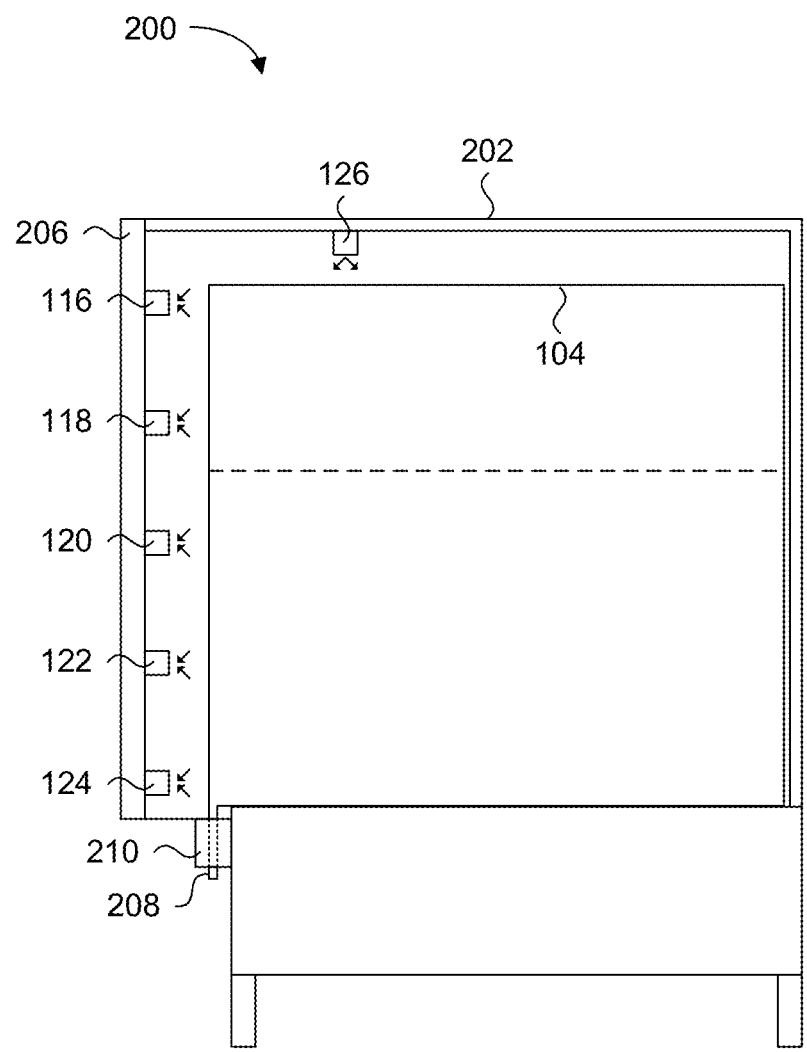
FIG. 3 shows a liquid dispensing apparatus with an integrated optical liquid height measuring system, according to an alternate embodiment.

FIG. 3 shows an alternate configuration of liquid dispensing apparatus 100 shown in FIG. 2. The main difference between the liquid dispensing apparatus 200 of FIG. 3 over that shown in FIG. 2, is the location of the light sensors and of the light source. The liquid dispensing apparatus 200 is very similar to the one shown in FIG. 2, in that it includes a rectangular shaped container 202 configured to receive a tank 104, and having a front door panel 206. The tank 104 has an outlet nozzle 208 coupled to a dispense control system 210, and the container 202 is supported by a chassis 212. These features are similar to features 102, 104, 106, 108, 110 and 112, and have the same functions. In the present embodiment, the light sensors 116-124 are now arrayed on an inside wall of the front door panel 206 and the light source 126 is now positioned closer to the front door panel 206. This configuration provides for easier access to the light source 126 and the light sensors 116-124 to help the cleaning process and maintenance. The operation of the liquid height measuring system is the same as described for the embodiment of FIG. 2. In this particular embodiment, the tank 104 is permitted to slide in and abut the rear panel of container 202, while the container 202 is configured to provide spacing between the arrayed light sensors 116-124 and the front panel of tank 104.

Figure 4A:
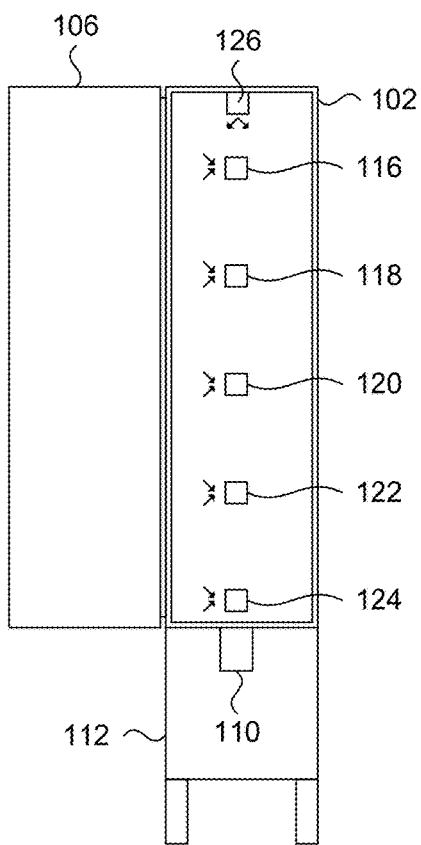
FIG. 4A shows a front end view of the liquid dispensing apparatus, according to a present embodiment.
Figure 4B:
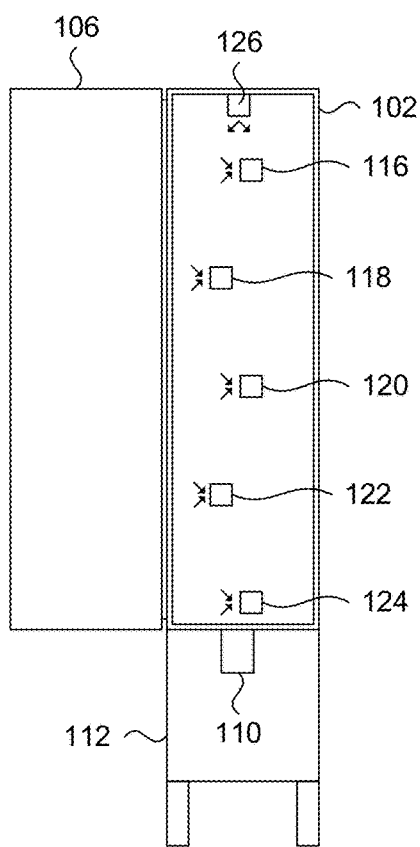
FIG. 4B shows a front end view of the liquid dispensing apparatus, according to an alternate embodiment.

FIG. 4A and FIG. 4B show possible arrangements of the light sensors in the container 102 of the liquid dispensing apparatus 100 shown in FIG. 2. The same numbering appearing in these figures refer to the same features shown in FIG. 2. FIG. 4A is a front end view of the liquid dispensing apparatus 100 with its front door panel 106 open to show the inside of container 102, with no tank inside to show the positioning of the light sensors 116-124 against the rear panel of container 102. In this particular configuration the light sensors 116-124 are linearly arranged from the bottom to the top of container 102, and centrally aligned between the left and right side panels of container 102. In the present view, the left and right side panels define the width dimension of container 102. It should be understood for the present embodiments that the container 102 is sized such that its width is maximized while allowing the tank to slide freely in and out. Therefore, when the tank is fully inserted into container 102, the array of light sensors 116-124 are also centrally aligned between the left and right side panels of the tank. It should be noted that the light source 126 can be centrally aligned in position relative to the left and right side panels of the tank, but it can also be offset without adversely affecting liquid height measuring. As previously mentioned, at least one additional light source can be positioned on the sidewalls of the container 102.

In the alternate configuration shown in FIG. 4B, the light sensors 116-124 are still arranged in a height dimension from the bottom to the top of container 102, but in a staggered pattern such that each light sensor is offset from the central axis between the left and right panels of container 102. In other words, the light sensors 116-124 do not necessarily need to be aligned to the same vertical axis along the height dimension of the container 102.

The configurations of the light sensors 116-124 shown in FIG. 4A and FIG. 4B can be used on the inside of the front door panel 206 in the embodiment of FIG. 3. In a further alternate embodiment, the light sensors 116-124 can be positioned on a side wall of container 102. In FIG. 4A by example, the light sensors 116-124 would be positioned along the right side or left side of container 102.

The previously shown embodiments of the liquid dispensing apparatus with an integrated optical liquid height measuring system are intended to show the general positioning and layout of the components relative to each other, and are not intended to be shown to scale. The specific dimensional positioning and layout of the components relative to each other may depend on the type of light source and light sensors being used. For example, the light source 126 can be any type of light source such as a light emitting diode (LED), which is detectable by the light sensors, but in some embodiments can be in the near infrared (NIR) part of the optical spectrum. As shown in the previous embodiments, the light source 126 is always positioned above the tank 104 and directed towards the surface of the liquid in the tank 104.

The choice of the NIR light source makes the scattering of the light to be significantly reduced when propagating through the visibly scattering material composing the tank lid and walls. This reduction of the amount of light signal that is being scattered also applies to frost and condensation forming at the surface of the tank wall. The light source emission pattern is downward, but some part of the light can reach through the upper part of the tank level where light sensor 116 is positioned on the container wall. In the present embodiments, this topmost light sensor 116 is referred to as a reference sensor and is positioned below the top of tank 104 and always above the liquid level liquid in the tank 104 when the tank has been filled to the maximum level. The light source 126 is positioned sufficiently above the tank and close to the container wall where light sensors are fixed in order to allow its light to reach them from small angles, such as from one fifth to one third of the level range to be measured.

Figure 5:
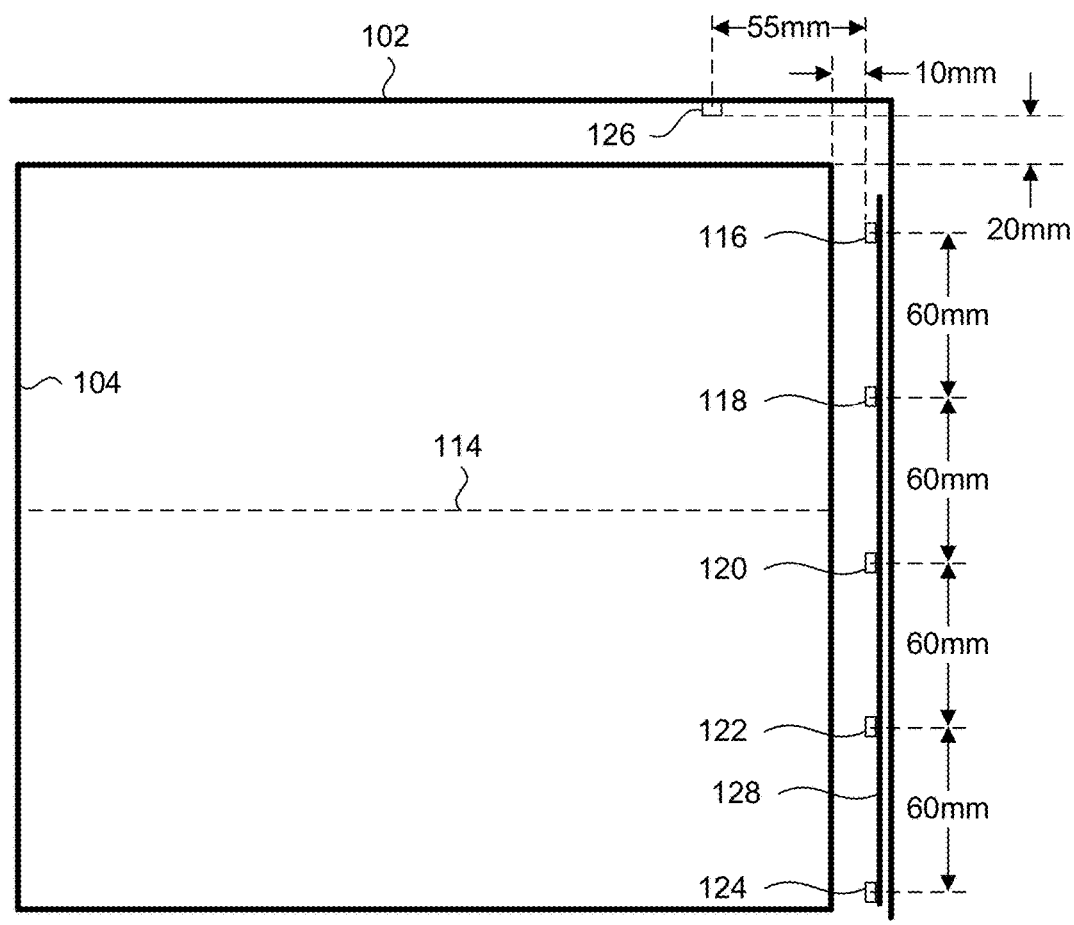
FIG. 5 shows an example configuration of the optical liquid height measuring system.

FIG. 5 is an illustration of a part of the liquid dispensing apparatus with an integrated optical liquid height measuring system of FIG. 2, showing example spacing of the components relative to each other, according to an example embodiment. The drawing parts are not shown to scale, and the following discussion provides some parameters for the components to be used in the system. It is first assumed in this example that tank 104 has a height of 28 cm, where the height dimension extends along a vertical direction of the page and a depth dimension extends along a horizontal direction of the page. It is noted that the depth of tank 104 is not relevant to the positioning of the light source 126 and light sensors 116-124.

In the presently shown example, the light source 126 (a central portion thereof) is placed at a distance of about 55 mm from the front surface of the light sensors 116-124 and about 20 mm above the top of the tank 104. More specifically, the emitting face of light source 126 is positioned about 20 mm above the top of the tank 104. In this example, the light source 126 has an emitting half angle of approximately 7 degrees. The rear wall of tank 104 is positioned to be about 10 mm from the front surface of the light sensors 116-124.

In the presently shown example, all the light sensors 116-124 are mounted to a printed circuit board 128 or some other prefabricated structure where the required wiring for signal transmission and power coupling for each of the mounted light sensors is integrated therein. The prefabricated structure is positioned such that the bottom most of light sensor 124 is about 5 mm from the bottom of the container floor or 0 mm from the bottom of the tank 104 which has small feet. The upper most light sensor 116 is about 25 cm from the bottom of the tank. According to an alternate embodiment, small heating elements can be positioned on the prefabricated structure and proximate to each of the light sensors 116-124 to melt any accumulated frost or ice buildup on the sensors where the container is refrigerated for a specific liquid product. Such heating elements can include at least one resistor with a controlled current flowing through it to generate heat. Alternately, any other means for generating heat proximate to the light sensors and the light source can be used. In one embodiment a single heating element is used, in another embodiment a single heating element on either side of the light sensor and light source is used. Additionally, the addition of a heating element near the light source improves the stability of the outputted light.

According to the present embodiments, the heating elements can be continually turned on while the refrigerating unit is turned on to minimize the accumulation of frost or ice buildup on the sensors. Alternately to conserve power, the heating elements can be controlled to turn on and off at a particular frequency and duty cycle that achieves the same effect. This frequency can be selected such that minimum frost or ice builds up in between cycles, and the duty cycle can be selected such that any accumulated frost or ice is melted. Additionally, the intensity of the heat generated by the heating elements can be modulated taking into account the selected frequency and duty cycle of operation.

By having the light sensors 116-124 mounted to the prefabricated structure, physical installation onto the rear panel of container 102 is made easier. Additionally, by having the required wiring and power routing integrated into the prefabricated structure allows for the use of a connector that mates with a complementary connector to electrically connect the prefabricated structure and its mounted components to the processing system (not shown), which as previously discussed can be installed in a front door panel. Accordingly, the placement of light source 126 should be positioned relative to the front surface of the light sensors 116-124 and not the rear panel of container 102, as the prefabricated structure offsets the position of the light sensors 116-124 from the rear panel. Therefore, it is assumed that all light sensors 116-124 have front surfaces that are generally aligned along with a common plane, with the understanding that there may be slight variances due to manufacturing and assembly tolerances.

The light sensors 116-124 are selected to have a large viewing angle to capture the light from the light source 126 while pointing directly toward the tank 104. Starting at the bottom of the tank 104, the first light sensor 124 is positioned as close as possible to the floor panel of container 102. Then the following intermediate light sensors 122, 120 and 118 can be uniformly spaced from each other, such as 60 mm by example in the presently shown example. According to alternate embodiments, the light sensors do not have to be uniformly spaced from each other. In embodiments where an increased level measurement accuracy is required, more detectors can be added. Alternatively, if an increase in the measurement accuracy at a specific level of the tank height is required, additional detectors can be added and more closely spaced around the region of the desired height level of the tank.

The last light sensor 116, being the reference sensor, is positioned above the maximum liquid level in the tank 104 but under the lid of the tank to allow part of the light from the light source 126 to reach it. As will be described in more detail later, the reference sensor enhances the accuracy the optical liquid height measuring system embodiments by correcting signals coming from other sensors from light source power fluctuations, or from scattering losses by frost and condensation forming at the surface of the tank.

While the above example embodiment of FIG. 5 illustrates a specific configuration of a tank 104 with light sensors 116-124 and light source 126, the following discussion provides some more generic parameters for the configuration of alternate embodiments of the liquid dispensing apparatus with an integrated optical liquid height measuring system.

The distance from the light sensors 116-124 detectors to the wall of the tank 104 is a minimum distance to avoid producing a very fast transition of the light signal reaching them. For example, if the light sensors 116-124 were fixed to the wall of the tank 104, the signal reaching them would change from maximum level to near minimum level within only few mm of change to the height of the liquid surface 114. However, if the light sensors 116-124 are too far from the wall of the tank 104, this transition would extend on a larger level range and would also require larger and more cumbersome dispenser to allow a larger distance between detectors and the tank wall. Also, being further from the light source 126, the signal produced by each light sensor 116-124 would be significantly reduced. A good compromise is to have a signal transition between 10% to 90% of the signal value range from one of the light sensors to extend over a liquid level range corresponding to the maximum liquid level divided by the number of light sensors, minus one. Hence the appropriate distance between the tank wall, light source 126 and light sensors 116-124 can be easily determined for the specific tank shape, walls, light source and liquid to be dispensed.

Figure 6:
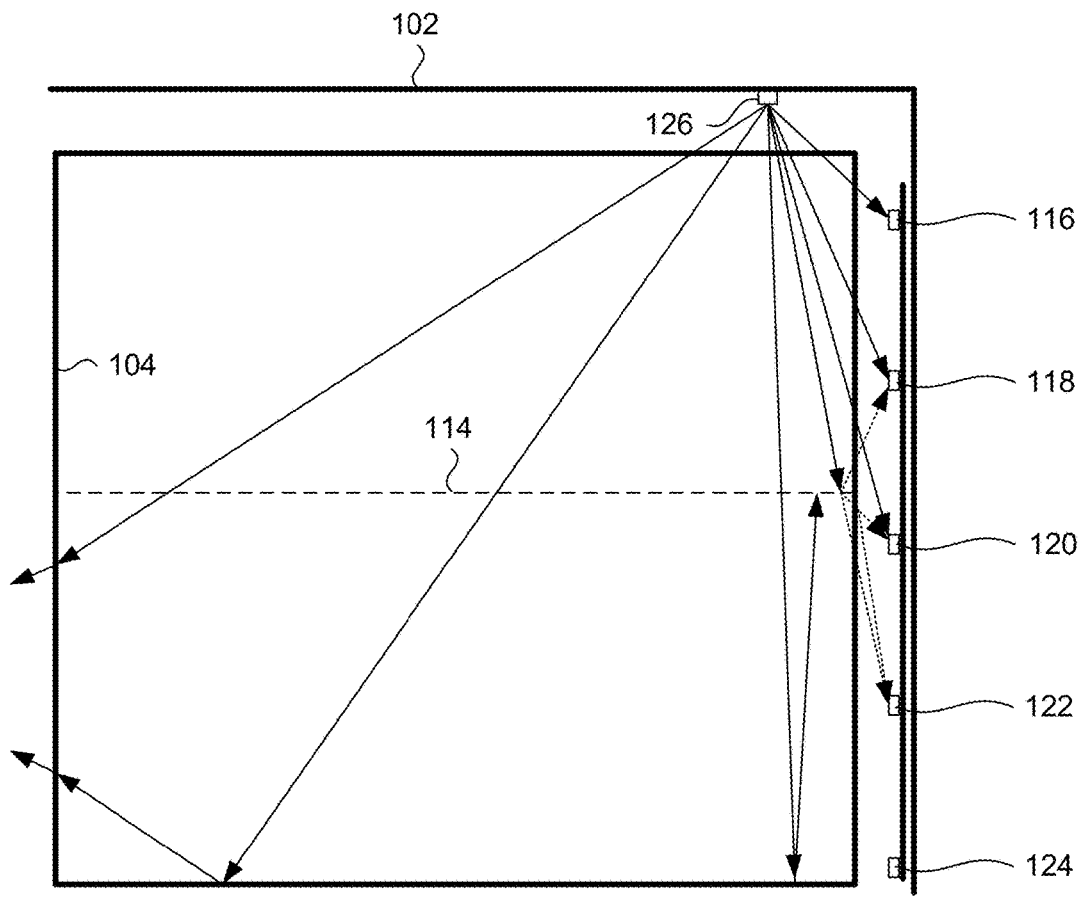
FIG. 6 shows possible light paths in the example configuration of FIG. 5.

Reference is made to FIG. 6, which shows the same elements as those shown FIG. 5, but omits the spacing details shown in FIG. 6. FIG. 6 illustrates some of the possible light paths from the light source 126 that can reach some of the light sensors through different paths, based on the present example where the liquid surface 114 is somewhere between light sensors 118 and 120 and the tank 104 has transparent/translucent walls and top.

The emitted light from light source 126 can pass directly through the top and walls of tank 104 for sensing by light sensors 116, 118 and 120. The emitted light from light source 126 can reflect at the liquid surface 114 towards light sensor 118, and can scatter/diffract through the liquid product itself and the tank walls, for sensing by light sensors 120 and 122. As shown in FIG. 6, arrows indicate some possible paths for the light emitted from light source 126, where some impinge directly upon some of the light sensors, while others pass through the tank and liquid and may reflect off of other surfaces of the container and the tank and back towards the light sensors, such as the sidewalls of the container 102. Some of the emitted light may pass through the tank wall opposite to the one proximate to the sensors. It follows that the intensity of light received by each of the sensors will change due to these light interrupting mediums, which will vary as the liquid surface 114 level changes. In the presently shown example, light sensor 124 may not receive any light from light source 126 either directly or indirectly as the light interrupting mediums have reduced the intensity at light sensor 124 to a level below its minimum detection threshold.

In principle, any light sensor positioned above the liquid surface 114 will receive more light than any light sensor positioned at or below the liquid surface 114 for the simple reason that the light sensors above the liquid surface 114 will not have any liquid product blocking or reducing most of the light from light source 126. However, there is variance in the level of detected light between the multiple light sensors above the liquid surface 114 and those below the liquid surface 114, which changes as the height of the liquid surface 114 changes. A person skilled in the art will therefore appreciate that the transmission, reflection and scattering optical properties of the container walls, tank and of the specific liquid, such as dairy product, is extremely complex and very difficult to model through simple computing.

It is for this reason that according to the embodiments of the present invention, a calibration technique is used to establish reference points for each type of liquid product, tank configuration, positioning of the tank in the container, and the container itself, since these can affect the optical properties involved in the light interaction phenomena that influence the amount of light reaching the light sensors.

Figure 7:
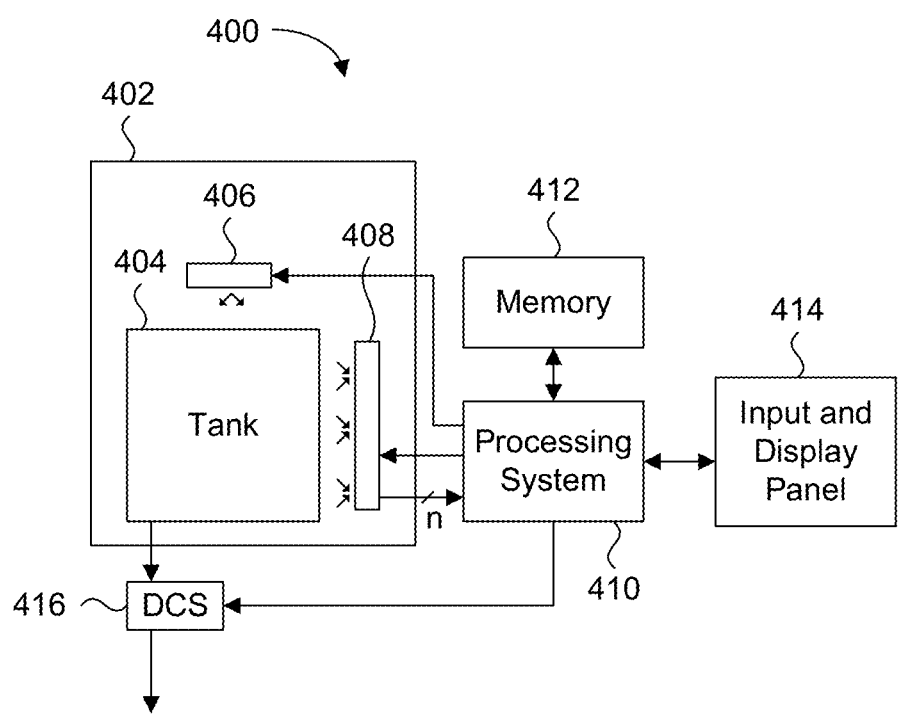
FIG. 7 is a block diagram of a liquid dispensing apparatus with an integrated optical liquid height measuring system, according to a present embodiment.

FIG. 7 is a block diagram of a liquid dispensing apparatus with an integrated optical liquid height measuring system, according to a present embodiment. The liquid dispensing apparatus 400 includes a container generally represented by box 402, a liquid storage tank 404, a light source 406, a light sensor array 408, a processing system 410, a memory 412, a user interface system 414, and a dispense control system 416.

The light source 406 can include any one of the previously mentioned specific types of light emitting devices, and the light sensor array 408 can include any number of complementary light sensors for detecting the light emitted from the light source 406. The light source 406 and the light sensor array 408 receive power and are controlled to turn on and off by the processing system 410.

The processing system 410 can include a microcontroller, microprocessor, or any other device or assembly of logic devices configured to control both the light source 406 and the light sensor array 408. In the block diagram of FIG. 7, separate control lines can be provided to each of the light source 406 and the light sensor array 408 to activate them when a liquid level measurement of the tank is required. As previously mentioned, the light source 406 and the light sensor array 408 can be turned on and off independently for specific durations of time. Alternately, a single common control line can be provided to both the light source 406 and the light sensor 408 to activate them when a liquid level measurement of the tank is required. The processing system 410 also receives electrical signals from each of the light sensors in the light sensor array 408. For example, if there are n light sensors in the light sensor array 408, then there are n signal lines for carrying respective electrical signals from each of the n light sensors. In one embodiment, analog to digital conversion is executed in the processing system 410 and therefore analog electrical signal such as voltage and/or current are received from the light sensors and then converted into digital form for the liquid level measurement processing. In an alternate embodiment, the light sensor array 408 includes the analog to digital conversion circuits, and therefore the processing system 410 receives the corresponding digital signals for each of the light sensors for the liquid level measurement processing.

The processing system 410 can be programmed to execute a calibration algorithm to obtain sets of measured n electrical signals, where each set of n electrical signals corresponds to a known discrete level of liquid in the tank. In the calibration algorithm, these sets of measured n electrical signals are referred to as sets of n calibrated signals. Details of the calibration algorithm are discussed later. The calibrated signal information and their corresponding known discrete height level of liquid, referred to as calibration data, can be stored in memory 412 as a lookup table. The calibration algorithm can be executed any number of times for different types of tanks and types of liquids stored in the tanks, where the data is stored in memory 412. In an alternate embodiment, the memory 412 can be loaded with calibration data obtained in advance using a similar liquid dispensing apparatus 400. For example, the manufacturer can execute all of the possible calibration algorithms and distribute the calibration data to all the deployed liquid dispensing apparatuses for storage in their respective memories 412.

The user interface system 414 can include a visual display to provide information, such as the measured liquid height in the tank, keypad and any other buttons that are required to operate the liquid dispensing apparatus 400. The user interface system 414 can also include a USB port for receiving calibration data from a USB storage device to be transferred into memory 412. Alternately or in addition to the USB port, the user interface system 414 can include a wireless interface, such as W-Fi or Bluetooth, to communicate this calibration data as well as to enable other higher level functions. The processing system 410 can easily be configured to control user interface system 414.

The dispense control system (DCS) 416 can be any mechanism for controlling the flow of liquid from the tank 404 through its outlet, thereby dispensing liquid into any receptacle underneath the outlet. The DCS 416 is controlled by the processing system 410 based on the measured liquid height in the tank 404. More specifically, if the liquid in the tank 404 is dispensed by gravity alone, then the DCS 416 can be any type of valve mechanism which is controlled to open for a specific period of time to dispense a known quantity of liquid based on an selected input received at user interface 414 and the measured liquid height in the tank 404. Those skilled in the art will appreciate that any type of liquid dispensing mechanism can be used for DCS 416, and liquid dispensing apparatus 400 is not limited to gravity based dispensing. By example, DCS 416 can include a peristaltic pump liquid dispensing mechanism.

Assuming that the memory 412 has been prestored with calibration data, the liquid dispensing apparatus 400 can be used to dispense liquid in the tank 404. It is further assumed that the type of liquid and tank are selected via the user interface 414 so that the proper set of calibration data is used by processing system 410. In one embodiment during normal dispensing operations, such as when the liquid dispensing apparatus is deployed in a convenience store or restaurant, the user interface 414 is actuated to receive a preselected volume or shot of liquid to dispense from tank 404. The processing system 410 then activates the light source 406 and light sensor array 408, and receives a set of n measured electrical signal values. The processing system 410 then executes a preprogrammed calculation algorithm for determining which set of n calibrated signal values is the closest match to the set of n measured electrical signal values. The selected set of n calibrated signal values corresponds to a known liquid height level, which is then displayed on the user interface system 414. In a gravity based liquid dispensing system, this determined liquid height level is used for further calculations to determine how long the DCS 416 is activated to allow liquid from the tank 404 to flow via gravity so that a preselected volume of liquid is dispensed. The system is ready to receive the next user selection. In an alternate embodiment, the liquid level measurement is executed after every dispense operation. In such an alternate embodiment, the initial liquid level measurement is executed as part of a reset operation when the door panel is closed, when the liquid dispensing apparatus is powered up, or in response to a manually actuated reset via the user interface system 414.

While not shown in the block diagram of FIG. 7, the light sensor array 408 can include analog to digital conversion circuitry for converting the electrical signals from the individual light sensors into digital values. Such analog to digital conversion circuitry can be positioned at any part of the system, but by placing them as close as possible to the light sensors themselves, signal noise can be minimized and higher analog to digital conversion accuracy can be obtained. Furthermore, while memory 412 is shown as a separate block, some or all of memory 412 can be placed in the light sensor array 408. By example, this memory in the light sensor array can store the calibration table, thereby allowing the entire array assembly to be a service drop in replacement part.

Following is a discussion of a method for obtaining the calibration data for a specific type of tank and a specific type of liquid in the tank that would be used in the liquid dispensing apparatus shown in the previous embodiments.

As previously mentioned, calibration data specific to each liquid product and tank configuration is executed before normal dispensing operations. This calibration takes into account differences in the light interrupting mediums due to different types of liquid products and tank configurations, and therefore establishes calibrated signal values by each detector for the discrete levels of a specific liquid in a specific tank. In particular, for each discrete level of liquid in the tank, there will be one set of calibrated signal values corresponding to the detectors.

Figure 8:
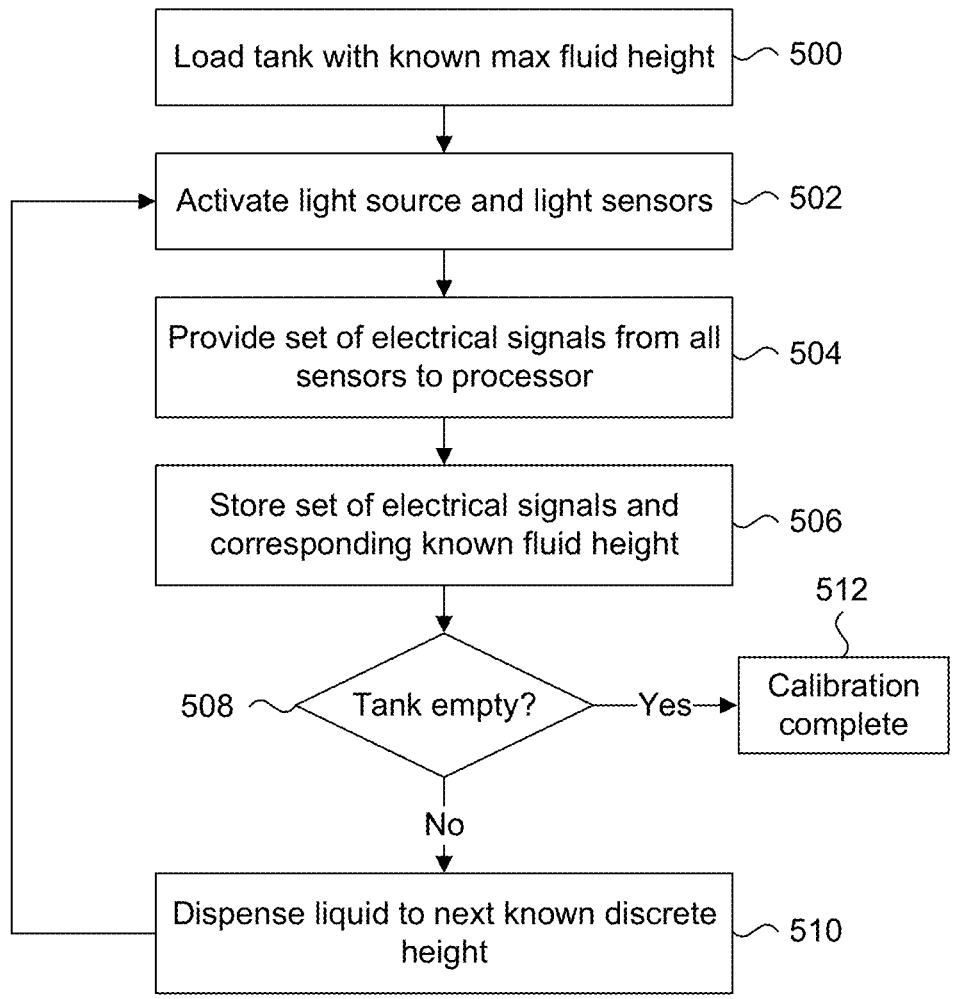
FIG. 8 is a flowchart of a method for obtaining calibration data for a liquid dispensing apparatus with an integrated optical liquid height measuring system, according to a present embodiment.

FIG. 8 is a flowchart outlining a method for obtaining calibration data for the embodiments of the liquid dispensing apparatus with integrated optical liquid height measuring system. Starting at 500, a tank with a known type of liquid is filled to a known maximum liquid height and loaded into the container of the liquid dispensing apparatus. By example, the height is measured in millimeters relative to the bottom surface of the tank. Then the light source and light sensors are activated at 502, and a set of electrical signals from all the light sensors are provided to the processing system at 504. Each light sensor will detect a different amount of light and generate a corresponding electrical signal value representing the amount of light it detects.

Since the maximum liquid height is known from 500, it is stored along with the values of the set of electrical signals received from the light sensors at 506. It is noted that the electrical signals can each be converted into a digital value for storage in memory, using known circuit elements such as analog to digital converters. Following at 508, a determination is made if the tank is empty, or if the liquid in the tank has reached some low-level where dispensing operations should end and a refill is required. If the tank is not deemed to be empty at 508 then the method proceeds to 510 where the liquid in the tank is drained or dispensed to the next known discrete height. In this example the next discrete height can be as small as 1 mm. The method loops back and repeats starting at 502. Eventually after numerous iterations, the tank will be deemed to be empty at 508 at which point the calibration process is complete and ends at 512. The resulting set of calibration data can then be copied and stored in the memories of other liquid dispensing apparatus. The method of FIG. 8 can be repeated for any number of combinations of tanks and liquids.

It is noted that different techniques can be employed to obtain the actual known discrete height of the liquid in the tank. In one technique, the actual liquid level is visually measured using transparent rulers fixed to the tank in the dispenser (not shown). This requires opening of the door at each measurement to read the measured level during the calibration process and to manually enter it for storage against the measured set of electrical signals received from the light sensors, via the user interface system by example. Alternative approaches which employ the use of load cells, capacitive sensors, cameras with image processing, ultra-sounds, floats with distance sensors, etc. can be used to determine the liquid level in the tank in an automated manner during this calibration procedure.

Figure 9:
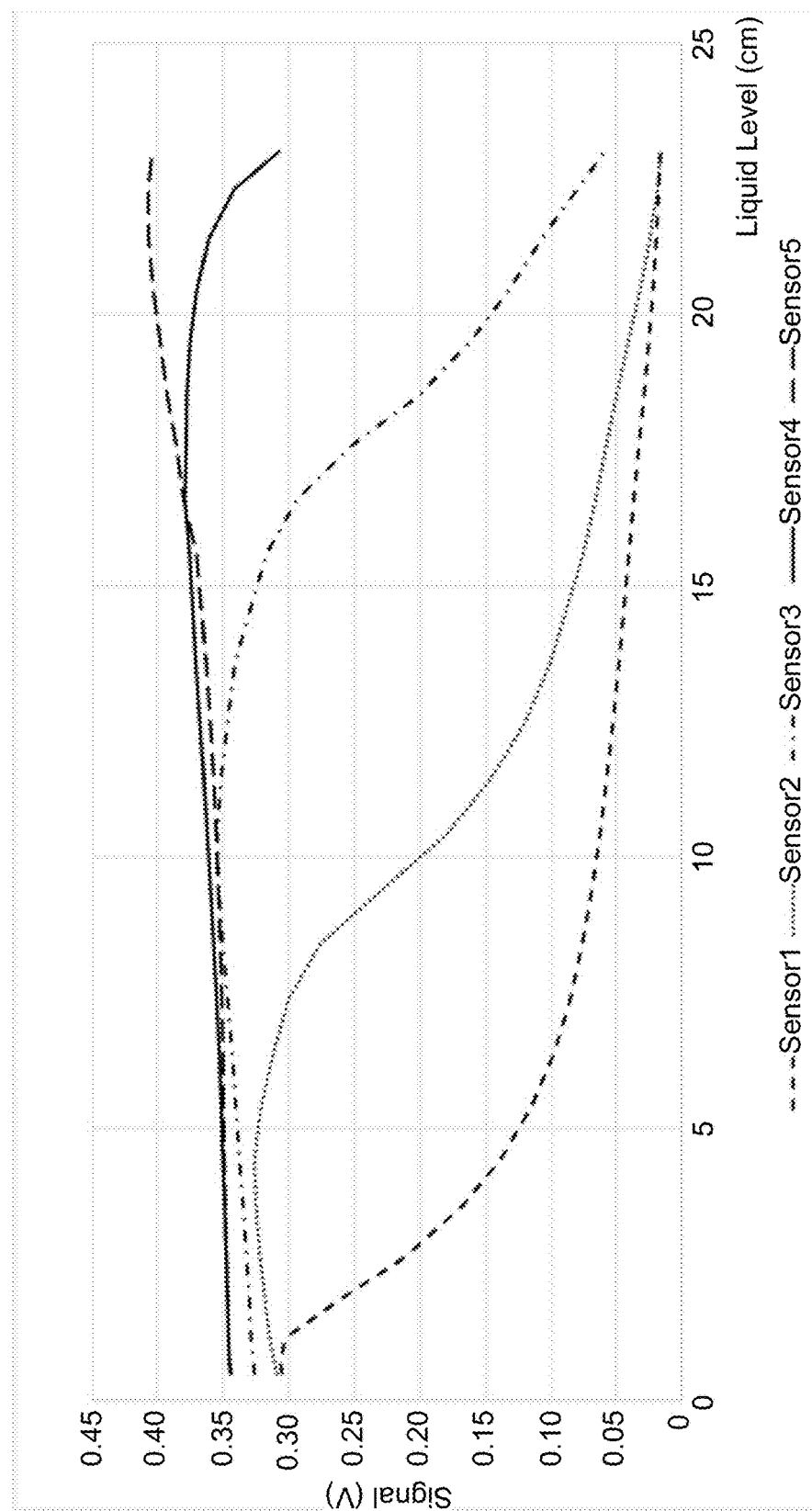
FIG. 9 is a graph showing example signal calibrations for multiple detectors.

FIG. 9 is a graph plotting example calibrated signal values against liquid levels in a tank obtained using the calibration method shown in FIG. 8 executed on a liquid dispensing apparatus shown in the previous embodiments. The graph has a vertical axis in units of volts (V) and a horizontal axis in units of centimeters (cm). In this particular example, the liquid in the tank is 3.25% milk, and there are five light sensors in the container, referred to as "Sensor1", "Sensor2", "Sensor3", "Sensor4" and "Sensor5". Relative to the embodiment shown in FIG. 5, Sensor5 corresponds to the topmost light sensor 116, Sensor4 corresponds to light sensor 118, Sensor3 corresponds to light sensor 120, Sensor2 corresponds to light sensor 122, and Sensor1 corresponds to the bottommost light sensor 124. The voltage signals from each light sensor in response to a detected amount of light as the liquid height in the tank drops is plotted in FIG. 9. The voltages for each sensor are shown by a separate line with a specific pattern as shown in the legend at the bottom of FIG. 9.

In this specific example, the minimum signal level from a light sensor is 25 mV and the maximum signal level from this same light sensor is 330 mV, and the maximum liquid level is 25 cm in a tank with a maximum height of 28 cm. The rear tank wall is positioned at a distance from the light sensors that would give a signal transition from 55-75 mV to 280 mV over a liquid level range of 6.25 cm. However, variance in the rear tank wall positioning relative to the light sensors to obtain good accuracy is possible depending on the number of light sensors used, the spacing there between, and the type of light source and light sensor as well. Similar to the embodiment of FIG. 5, the liquid dispensing apparatus has a light source positioned about 5 cm away from the front face of the light sensors, and about 2 cm above the top of the tank or about 5 cm from the topmost light sensor.

Returning to FIG. 9, it can be seen that Sensor 5 (topmost light sensor) has a signal level that stays high while the signal level for Sensor1 reaches high signal values only when the milk level is low. Sensor2, Sensor 3 and Sensor 4 reach their highest signal values at intermediate milk levels that roughly corresponds to a few centimeters below their actual level position with respect to liquid level in the tank. This is due to the combination of direct light from the light source reaching the light sensor in addition to light reflected and scattered from the milk surface and tank respectively. Once this calibration data has been obtained and saved, it is used against measured signals during regular use.

It is noted that the light source may not provide a consistent level of light, as the level of emitted light can change over time due to any one or more of aging and power supply variations. It is for this reason that a more consistent level discrimination and measurement accuracy can be obtained by using the light signal from Sensor5 which is always positioned over the maximum level of liquid in the tank to normalize or to perform ratio of signals from the other detectors positioned below the maximum liquid level of the tank. This is illustrated in FIG. 10.

Figure 10:
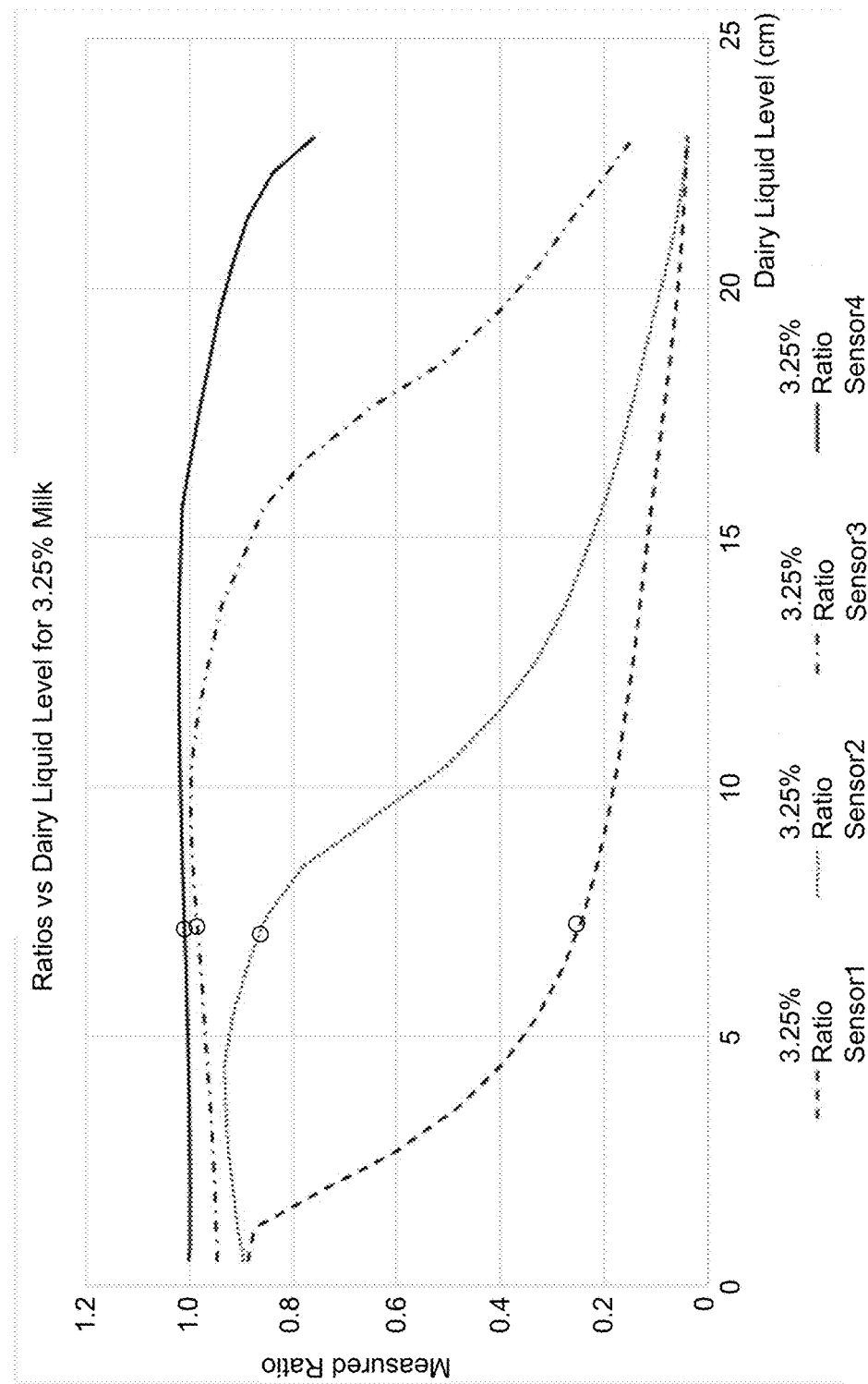
FIG. 10 is a graph showing ratios of the signal calibrations relative to a reference light sensor signal.

FIG. 10 shows example calibration curves obtained by a normalization of measured signals with signals measured with the detector above liquid level. More specifically, each signal point shown in FIG. 9 of a light sensor is converted into a ratio relative to the reference light signal from Sensor5 at each liquid height level. The resulting ratio curves for Sensor1, Sensor2, Sensor3 and Sensor4 are shown in FIG. 10. This can easily be done by the processing system as a simple mathematical operation and storing the normalized calibrated signal values in memory. Now normal dispensing operations can proceed by taking the measured signal values from each light sensor, normalizing them against the reference signal value, and then executing a comparison operation to determine which set of stored calibrated and normalized calibrated signal values is nearest to the normalized set of measured signal values. Of course, if a different dairy product is to be used or a tank with different wall transparency is to be used, new calibration data for that specific combination of new dairy product and tank is performed. It is noted that it is not necessary to store the normalized and calibrated signal values, and just the calibrated signal values can be stored in memory. In such an embodiment, the normalization can occur dynamically on the fly.

The embodiments of liquid dispensing apparatus with an integrated optical liquid height measuring system have been described, as well as method embodiments for obtaining calibration data for a specific combination of a tank and liquid product stored within the tank. With the normalized calibration data stored in the memory of the liquid dispensing apparatus, any measured set of signals from the sensors can be processed to determine the approximate liquid level height in the tank. In one embodiment, the memory can be non-volatile memory such that the data is retained even when there is no power supplied to all the components of the liquid dispensing apparatus.

Figure 11:
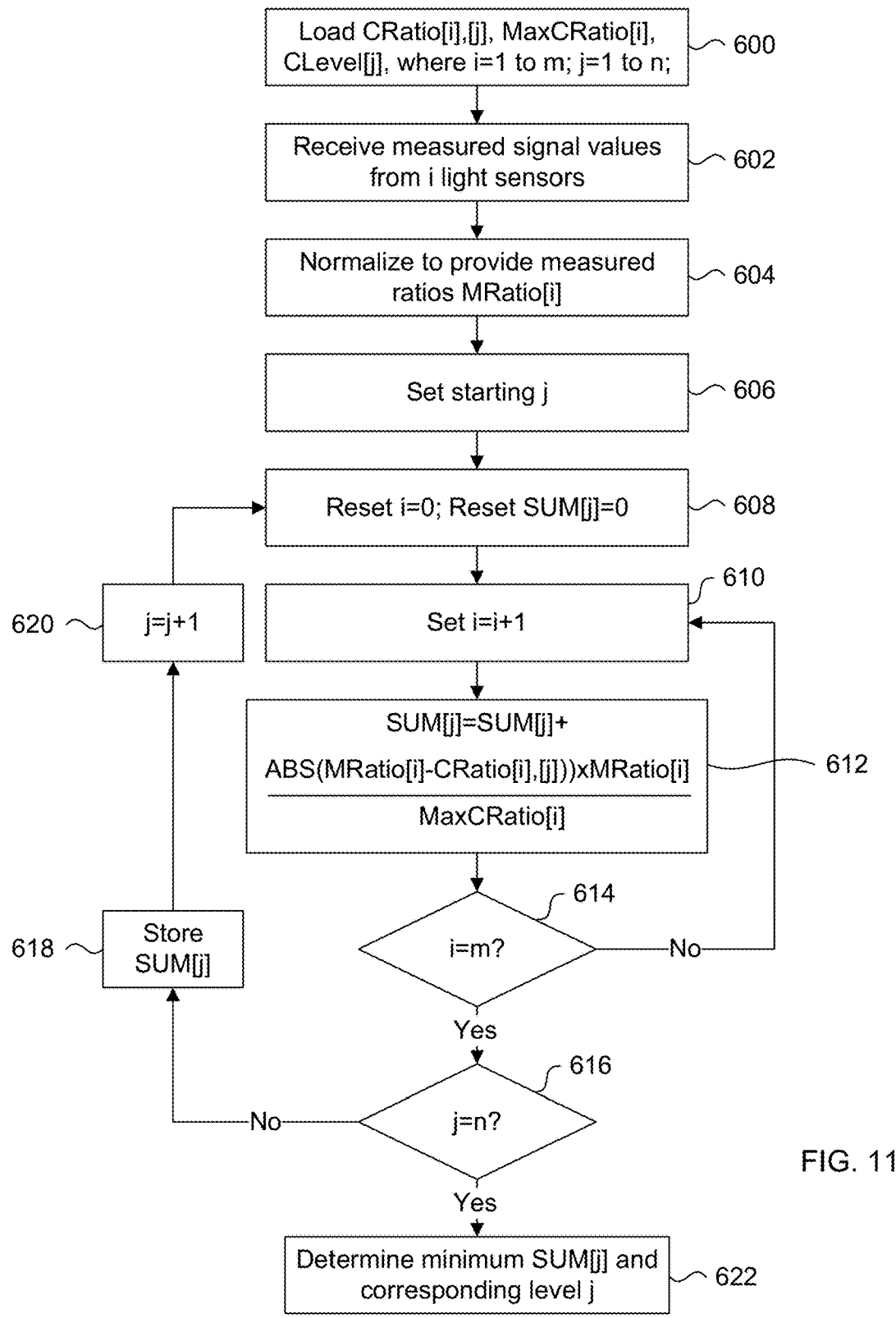
FIG. 11 is a flow chart showing a method of processing signals received from light sensors to determine liquid liquid height in a tank, according to a present embodiment.

An embodiment for processing the measured set of signals from the sensors is now described, with reference to the flow chart of FIG. 11. It is assumed of course that the normalized calibration data has been obtained and stored in memory of the liquid dispensing apparatus at 600, for access by the processing system. This stored calibration data is referred to as calibrated ratio CRatio[i],[j], maximum calibrated ratio MaxCRatio[i] and calibrated level CLevel[j]. The variable "i" is an integer value representing each of the light sensors and thus can be between 1 and m, where 1 is the calibrated ratio corresponding to the first light sensor and m is calibrated ratio for the last light sensor that is not the reference light sensor. For this discussion, reference to the light sensors excludes the reference light sensor. The variable "j" is an integer value representing logical positions where a discrete level of liquid in the tank has been measured and can be between 1 and n, where 1 is a first position and n is the last position. In some embodiments, the first position corresponds to a maximum discrete liquid level near the top of the tank and the last position corresponds to a minimum discrete liquid level near the bottom of the tank. Therefore, CRatio[i],[j] is a calibrated ratio value for a light sensor[i] at a particular position[j], MaxCRatio[i] is the maximum ratio value for a light sensor[i], and CLevel[j] is the true liquid tank level in centimeters or millimeters, or in any desired unit of measurement, at position[j].

The method of FIG. 11 begins at 600, where the stored values for CRatio[i],[j], MaxCRatio[i] and CLevel[j] are read out from memory and stored locally for quick access by the processing system. Analog measured signal values from all of the i light sensors are received at 602 when a liquid height measurement operation is initiated, which are then normalized relative to the reference signal from the reference light sensor at 604. Table 1 below lists example voltage signal values from the light sensors using the liquid dispensing apparatus of the present embodiments by example, along with their respective normalized measured ratios MRatio[i].

TABLE 1

| Light Sensor [i] | Voltage signal (V) | Measured ratio MRatio [i] |
|---|---|---|
| i = 1 | 0.105 | 0.3 |
| i = 2 | 0.317 | 0.906 |
| i = 3 | 0.34 | 0.971 |
| i = 4 = m | 0.347 | 0.991 |
| i = 5 (reference) | 0.35 | N/A |

By example, FIG. 10 has been annotated with small circles indicating approximately where the measured ratio for each of the light sensors may appear relative to the shown calibration curves.

Proceeding to 606, the variable j is set to a starting point, such as j=1 for this example calculation method embodiment. According to alternate embodiments, the starting point of j can be set to different starting positions as will be discussed later. At 608, the variable i for the light sensors is reset set to 0. Also at 608, a cumulative sum of ratios for the light sensors SUM[j] at the current position j=1 is reset to 0. The variable i is incremented at 610, therefore in this first iteration i=1 while j=1. Following at 612, the value of SUM[j] at the current position j=1 is updated by Equation 1 below:

$$SUM[j]=SUM[j]+(ABS(MRatio[i]-CRatio[i],[j]))\times MRatio[i]/MaxCRatio[i],$$   Equation 1:

where ABS is an absolute value operator.

The absolute value of the difference between the measured ratio MRatio[i] and the calibration ratio value CRatio[i],[j] for light sensor i at position j is weighted by multiplying it by the measured value MRatio[i] over the maximum ratio value MaxCRatio[i] of the same light sensor i. This process allows decreasing the relative importance (or weight) of low value measured signals that could be more subject to errors from noise or changes in offset DC values. In short, the (ABS(MRatio[i]-CRatio[i],[j]))×MRatio[i])/MaxCRatio[i] calculation at 612 yields a difference value between the measured ratio for a particular light sensor and a calibrated ratio for the same light sensor at position j.

The method then proceeds to 614 where a determination is made if the current value of i=m, where m corresponds to the last light sensor excluding the reference light sensor. If i does not equal m, the method returns to 610 where i is incremented again and SUM[j] is updated at 612. Steps 610, 612 and 614 continue until i=m, which means that a summing of differences has been completed for all the light sensors 1 to m, for position j. Mathematically, steps 610, 612 and 614 for calculating SUM[j] can be expressed as follows in Equation 2 below.

$$SUM[j] = \sum_{i=1}^{m} \frac{ABS(MRatio[i] - CRatio[i], [j]) \times MRatio[i]}{MaxCRatio[i]}$$   Equation 2

The method proceeds to 616 where another determination is made to see if present position j is the last position n. If not, then the present SUM[j] value is stored in memory for position j at 618, and j is incremented at 620 before returning to 608. Returning to 608, both i and SUM[j] our reset to 0 and the method repeats in the manner as previously described except that the only calibrated ratio values that change is the CRatio[i],[j] ratios, which now correspond to the incremented j position.

Steps 608, 610, 612, 614, 616, 618 and 620 repeat until it is eventually determined that j=n, which means that a summation of ratio differences SUM[j] has been calculated for each position of j. The method now proceeds to 622 where the smallest SUM[j] value is determined, which can be executed by a simple minimum value function.

Figure 12:
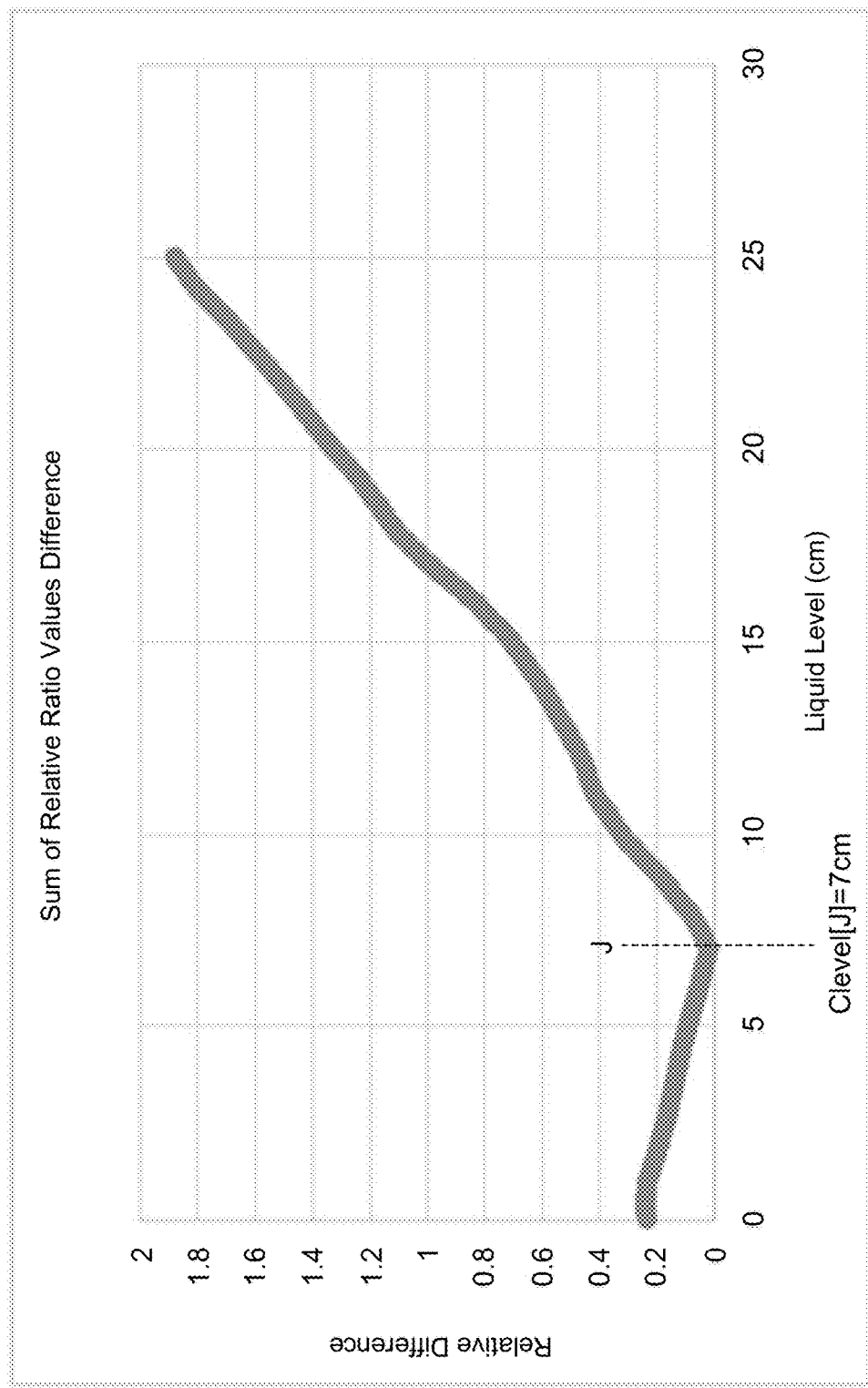
FIG. 12 is a graph plotting example sum of relative ratio values differences for determining liquid level, according to a present embodiment.

For visually illustrative purposes, all of the SUM[j] values are plotted in the graph of FIG. 12. The horizontal axis is the liquid level in the tank in units of cm, while the vertical axis is the calculated SUM[j] value for every position of j=1 to m. The graph clearly shows that the relative difference between the measured ratios MRatio[i] relative to the calibrated ratios CRatio[i],[j] at each position of j reaches a minimum value at position J where the true liquid tank level is 7 cm (CLevel[J]=7 cm).

A minimum sum of differences value SUM[j] means that the set of MRatio[i] values of all of the light sensors are nearest to one set of corresponding calibrated ratios CRatio[i], which correspond to a particular position j. Because each SUM[j] value is cross-referenced with a corresponding j position, once the minimum SUM[j] value has been identified, its corresponding position j is also identified. This selected position j is looked up in the table to obtain the corresponding true liquid tank level CLevel[j]. This true liquid tank level is now used in subsequent operations, which can include displaying it on the user interface system, and executing additional calculations for determining a period of time to allow liquid to dispense from the tank by gravity the DCS.

In the embodiment of FIG. 11 for processing the measured set of signals from the sensors, it is assumed that the starting j value is 1, when j=1 to n and n is the maximum value. Then the value of j is incremented to obtain a new SUM[j]. With reference to the graph of FIG. 12 by example, j=1 can be at the rightmost side of the graph while j=n can be at the leftmost side of the graph, or vice versa. Such configurations are possible because positions j are logical values and all that matters is that for each position j there is a set of calibrated ratios CRatio[1], CRatio[2], CRatio[3] to CRatio[n] corresponding to a true liquid tank level CLevel[j]. Therefore the embodiment of FIG. 11 calculates each SUM[j] in a sequential pattern each time a liquid level measurement is required. While modern processing systems are capable of high speed calculations, some embodiments may require such a high number of SUM[j] that the amount of time required to conduct all the calculations introduces a perceptible delay, which may not be desirable in some applications.

Therefore, different patterns of calculating SUM[j] other than the above noted sequential patterns can be employed in alternate embodiments. For example, the processing system can be configured to carry out two SUM[j] calculations for different j positions concurrently to decrease the total calculation time in half relative to the embodiment of FIG.

In other alternate embodiments, a sequential pattern can be employed starting with a coarse interval between j position calculations of SUM[j] in one direction and dynamically monitoring each calculation to see if the trend of the difference changes direction. A trend can easily be determined mathematically by examining the difference between current and previous SUM[j] values, where the presence of a negative difference (or vice versa) indicates a reversal in the trend. In such an embodiment, the calculation pattern reverses in direction with a fine interval to cover the range of j positions where the difference changed signs. This minimizes the number of unnecessary SUM[j] calculations.

In yet a further alternate embodiment, the range of j position calculations for SUM[j] can dynamically decrease given that the liquid level of the tank will always decrease as the number of dispenses increases for the tank. In such an embodiment, the processing system can store in memory the minimum J position of the last measurement made so that the next measurement starts with j=J instead of starting over with j=1.

Different processing patterns and combinations of known patterns can be used to minimize the number of calculations and therefore time, required for obtaining the liquid height measurement. In summary, alternate embodiments can execute any type of high speed coarse calculation to determine the general range of levels where the liquid level may actually be, followed by a slower fine calculation within this range of levels to determine the actual liquid level.

The previously described Equations 1 and 2 represents one type of calculation that can be used in the present embodiments. In an alternate embodiment, Equations 1 and 2 can be replaced with Equations 3 and 4 below.

$$SUM[j]=SUM[j]+ABS((MRatio[i]-CRatio[i],[j])\times CWeight[i],[j]) \quad \text{Equation 3:}$$

$$SUM[j]=\Sigma_{i=1}{}^{m}ABS(MRatio[i]-CRatio[i],[j])\times CWeight[i],[j] \quad \text{Equation 4:}$$

These equations are similar to Equations 1 and 2, except now the term CWeight[i],[j] replaces MRatio[i])/MaxCRatio[i]. CWeight[i],[j] is a calibration weight indicating the importance of a light sensor [i] at position[j].

The absolute value of the difference between the measured ratio MRatio[i] and the calibration ratio value CRatio[i],[j] for light sensor i at position j is weighted by multiplying it by the calibration weight CWeight[i][j], that reflects the local normalized slope of the calibration for detector [i] at level [j]. The CWeight[i][j] values are calculated at the end of the calibration process as follows. For every level [j], the local slope (signal variation between level [j] and [j−1] is normalized so that the sum of all 5 slopes (each slope corresponding to each light sensor) is 1 at each level [j]. In one mathematical example, CWeight [i][j]=CRatio[i][j]−CRatio[i][j−1]. After all CWeight are calculated, they are normalized as CWeight [i][j]=CWeight [i][j]/SUMi× CWeight[i][j].

In an alternate embodiment, the slope can be computed as the mean slope between 2-3 levels around the level [j] for an improved comparison.

Accordingly, the flowchart outlining a method for obtaining calibration data shown in FIG. 8 is modified to accommodate this alternate embodiment. More specifically at step 508 when the tank has been determined to be empty, instead of ending the calibration process at 512, the above mentioned weighting calculation for CWeight[i][j] is executed and the data stored prior to ending the calibration process at 512.

This process allows decreasing the relative importance (or weight) of locally flat calibration curves to which detector signal comparison could be more subject to errors from noise or changes in offset DC values. In short, the ABS ((MRatio[i]−CRatio[i],[j])×CWeight[i][j]) calculation yields a difference value between the measured ratio for a particular light sensor and a calibrated ratio for the same light sensor at position j.

Therefore, for this particular embodiment the stored calibration data in memory includes calibrated ratio CRatio[i],[j], calibration weight CWeight [i],[j] and calibrated level CLevel[j], and the method of FIG. 11 can be adapted based on Equation 4 above.

Figure 13:
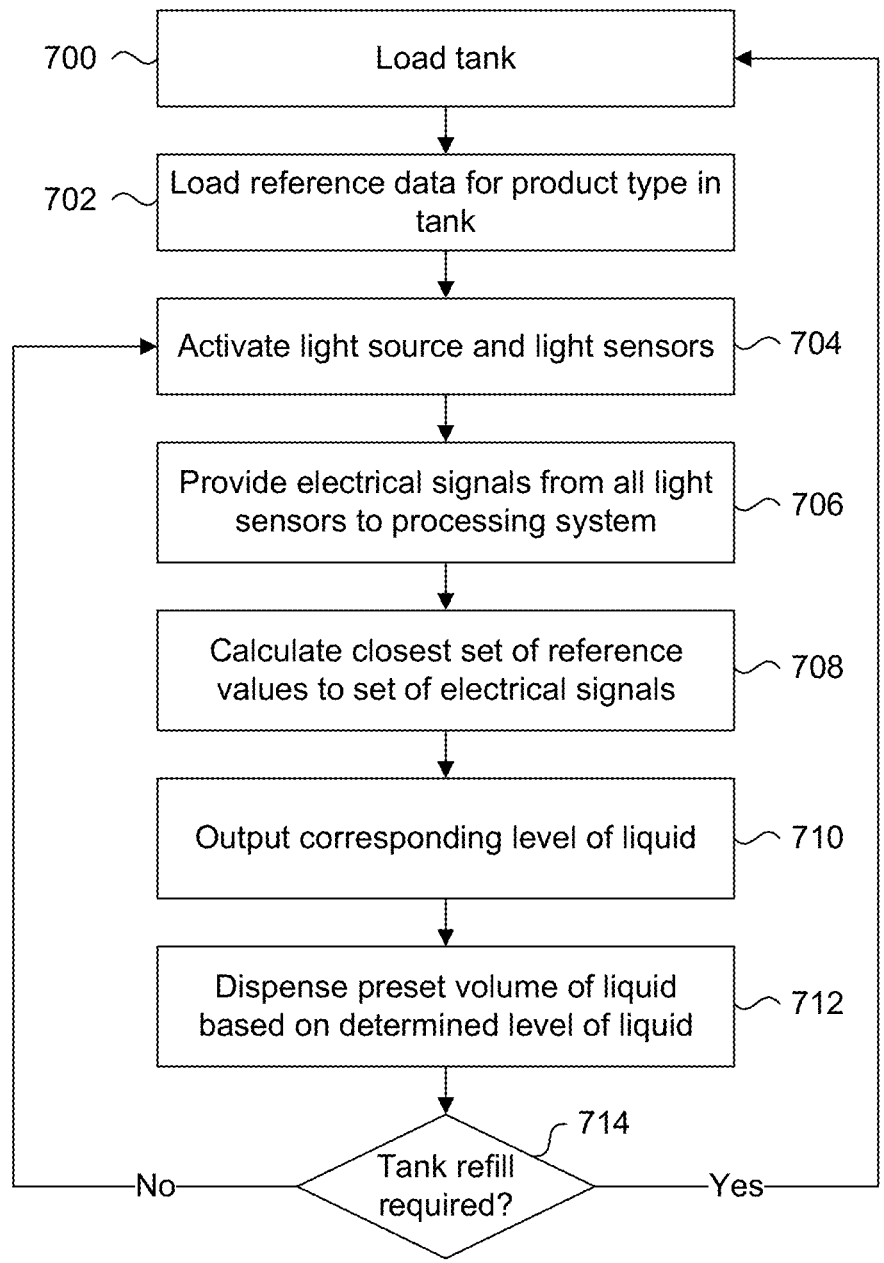
FIG. 13 is a flow chart of a method for operating a liquid dispensing apparatus with an integrated optical liquid height measuring system, according to a present embodiment.

FIG. 13 summarizes a method of operating a liquid dispensing apparatus with an integrated optical liquid height measuring system, according to a present embodiment. The method begins at 700 where a tank with liquid product filled to a maximum level is loaded into the apparatus. The front panel of the apparatus is closed and the specific liquid product type and tank type are selected through the user interface system for loading the corresponding calibration data at 702 prestored in memory. This step corresponds to steps 600 of FIG. 11. Step 700 and 702 constitute part of a reset operation, therefore the system automatically proceeds 704 to initiate a liquid level measuring operation. At 704, the light source and light sensors are activated and eventually all electrical signals from the light sensors are provided to the processing system at 706. While not shown in FIG. 13, the light source and light sensors can be turned off to conserve energy.

Now having the electrical signal values from the light sensors, the processing system executes calculations to identify one set of the calibrated signal values stored in memory that are nearest to the measured signal values from the light sensors at 708. In step 708, the method embodiment of FIG. 11 can be executed to identify the set of calibrated signal values nearest to the measured signal values from the light sensors. At 710, the stored calibrated level of liquid is output to various systems of the apparatus, including an electronic display panel to provide the level of liquid in the tank in specific units, and is used to calculate how long a DCS is activated to allow liquid from the tank to flow via gravity so that any amount of preselected volume of liquid is dispensed. For example, the system may be preprogrammed to dispense 3 different specific volumes of liquid from the tank. A preselected volume of liquid is dispensed at 712 based on the level of liquid in the tank and in response to a selection from the user interface system.

After dispensing of liquid at 712, a determination is made if the tank needs to be refilled at 714. This can be based on the previously determined level of liquid reaching some predetermined threshold that still allows for at least the largest volume of preselected volumes of liquid to be dispensed at 712. If the tank does not require a refill, then the method loops back to 704 to initiate another liquid level measuring operation, as the liquid level in the tank has dropped after the dispense at 712. Otherwise, if the tank requires a refill, then the method loops back to 700. Returning to the step 700, a different tank with different liquid product can be loaded into the apparatus, which means that different calibration data is loaded at 702.

The method of FIG. 13 can be modified to perform step 708 in response to a selection of preselected volume to dispense, or at any other suitable point that ensures the proper amount of liquid is dispensed.

The previously described embodiments show a configuration where the container is sized and shaped to house a single tank. In an alternate embodiment, the container can be sized and shaped to receive two or more tanks in a side-by-side arrangement.

Figure 14:
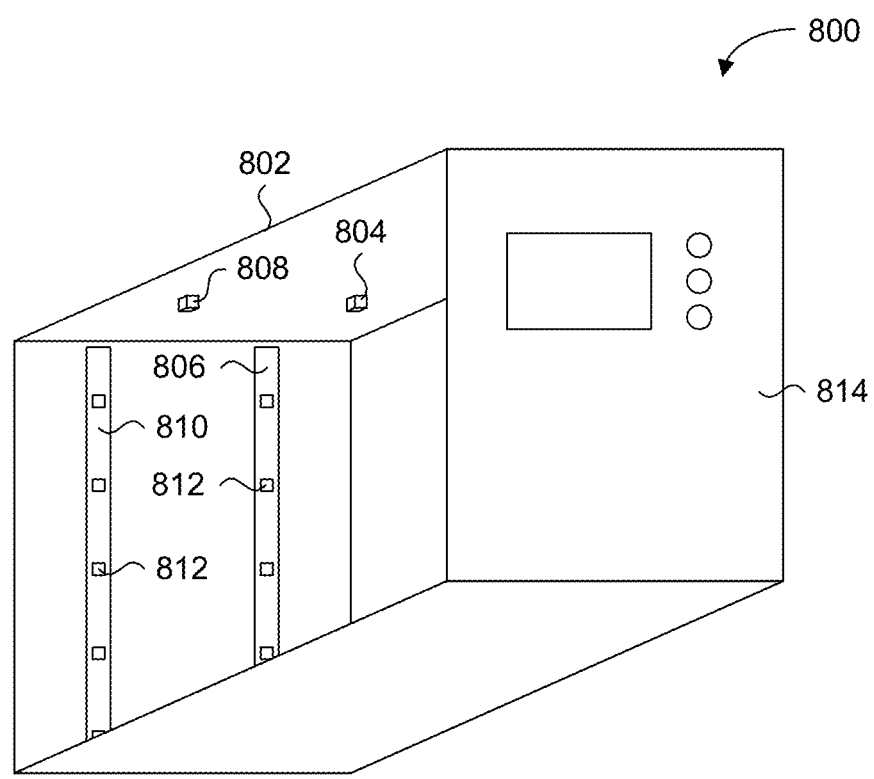
FIG. 14 is a perspective view of a multi-tank liquid dispensing apparatus with an integrated optical liquid height measuring system, according to a present embodiment.

FIG. 14 is a perspective view of a multi-tank liquid dispensing apparatus with an integrated optical liquid height measuring system, according to a present embodiment. In this perspective view of liquid dispensing apparatus 800, a side wall of the container 802 is omitted to show the components arranged inside. In this embodiment there are dedicated independent liquid height measuring systems for each of the tanks. The first liquid height measuring system includes light source 804 and a light sensor array 806, while the second liquid height measuring system includes light source 808 and a light sensor array 810. The light sensor arrays 806 and 810 each include light sensors 812 mounted to a printed circuit board or some other prefabricated structure where the required wiring for signal transmission and power coupling for each of the mounted light sensors 812 is integrated therein. As discussed for a previous embodiment, each light sensor array can also include analog-to-digital converters and memory for storage of calibration data. By having the light sensors 812 mounted to the prefabricated structure, physical installation onto the rear panel of container 802 is made easier. Additionally, by having the required wiring and power routing integrated into the prefabricated structure allows for the use of a connector that mates with a complementary connector to electrically connect the prefabricated structure and its mounted components to the processing system (not shown), which as previously discussed can be installed in a front door panel 814. In the presently shown embodiment, there are five light sensors 812 in each of the sensor arrays 806 and 810, some of which are partially or fully hidden due to the perspective view of the drawing.

In the presently shown example of FIG. 14, the components of the first liquid height measuring system are arranged in a manner as shown in FIG. 4A. Similarly, the components of the second liquid height measuring system are arranged in a manner as shown in FIG. 4A. Therefore, the light source 804 and its associated light sensor array 806 are positioned generally central to the width dimension of a first tank, while the light source 808 and its associated light sensor array 810 are positioned generally central to the width dimension of a second tank. Alternately, light sensors can be arranged as shown in FIG. 4B. While not shown in FIG. 15, a dividing wall is included to separate the two tanks from each other and to block all light emitted from one light source from reaching the adjacent tank and other light sensor array. Accordingly, each tank can store different liquids and therefore different calibration data would be used for first and second liquid height measuring systems.

The general operation of the first and second liquid height measuring systems is now discussed with reference to the embodiment of FIG. 14. In one mode of operation, a first liquid height measuring system (ie. 804, 806 and 812) is enabled for tank liquid level determination while the second liquid height measuring system (ie. 808, 810 and 812) remains inactive.

Alternately, a full or partial dividing wall can be inserted between the tanks such that no light from one light source of the first liquid height measuring system can be detected from the light sensors of the second liquid height measuring system. In such an alternate configuration, both the first and the second liquid height measuring systems can be enabled concurrently for tank liquid level determination of both tanks at the same time. While the present embodiment is configured for two tanks, this can be scaled up for larger systems having more than two tanks.

The embodiment of FIG. 14 shows light sensor arrays 806 and 810 mounted to a rear wall of the container. In an alternate embodiment, the light sensor array 806 is positioned on the right side wall of container 802 while light sensor array 810 is positioned on the left side wall of container 802. In such an alternate configuration, a full dividing wall is used.

In the previously described embodiments, calibrated and measured signals from the light sensors are converted into a ratio relative to a reference signal from a reference light sensor. This technique provides measurement robustness in applications where the container of the dispensing apparatus is refrigerated, for dispensing liquid dairy products which require refrigeration to prevent premature spoiling by example. In such applications where a liquid product requires refrigeration, or the liquid product is preferably refrigerated, the temperature dependency of the light sensors becomes relevant when performing any calibrations or measurements using the previously described liquid height measuring system. Notably, the temperature in a refrigerated container can vary by up to 15° C. Experiments using the previously described embodiments have demonstrated signal variation from the light sensors of approximately 10% when the temperature varies between −16° C. to −6° C. for the same level of liquid in the tank. Accordingly, this introduces error into the determination of the liquid level in the tank when the measurements are based on the raw signal levels from the light sensors.

However, by using the ratio of a signal relative to a reference signal in this same experiment the same signal changes are lowered to 5%, and it has been observed that in the sensitive (high slope value) part of the calibration curves, 5% or less change in ratio values represent liquid level differences below 5 mm. Hence, using ratios of signal levels with respect to the liquid level significantly reduces the impact of temperature changes on the assessed liquid level since all detector signals will suffer similar temperature changes and related changes in response. This technique is equally effective for minimizing the impact of changes in the power output of the light source over time due to aging.

To minimize thermal/temperature effects upon the sensors, and of thermal effects upon the light source, the devices can be potted. Potting is a well-known technique in the field of manufacturing and assembling the electronics where a device is surrounded by a suitable material, such as epoxy and silicone.

That said, there may be applications where the container is not refrigerated and the light sensors operate in an environment with minimal change in temperature. In such applications, the system can be configured to operate on the raw signal levels from the light sensors.

However, it is possible to further minimize the effects of temperature changes in the container on the light sensors. As previously described, heating elements are placed proximate to each light sensor for the purposes of preventing or minimizing ice or frost buildup on the light sensor, in the situation where the container is refrigerated. In an embodiment, these heating elements can be used to maintain a substantially constant temperature of each light sensor regardless of its position so that all the light sensors behave the same way. In one embodiment, temperature sensors can be positioned to sense and report the temperature of each light sensor to the processing system, thereby providing a feedback loop. The processing system can then control the amount of current to each heating element to regulate its temperature to a predetermined set point that was used for calibration.

In an alternate embodiment, all the light sensors can be cooled to a predetermined temperature. It has been observed that some light sensors display greater sensitivity at lower temperatures, meaning that stronger electrical signals are generated in response to lower levels of received light. Similar to the heating element embodiment described above, all the light sensors should be cooled to have the same temperature. By example, all the light sensors can be encapsulated in a single elongate transparent compartment where a cooled temperature can be maintained inside. To minimize frost buildup on the outside of the compartment due to the cool temperature in the container, heating elements can installed on the outside of the transparent compartment and activated periodically. In this example, the heating elements are always turned off when a liquid level measurement operation is initiated to maintain the light sensors at the predetermined set point temperature.

The previously described embodiments show a system with 5 light sensors. More than 5 light sensors can be used, and experiments have shown that a system using 8 light sensors also provides excellent accuracy relative to cost.

It is noted that the previously described optical liquid height measuring system is not limited for use in a liquid dispensing apparatus that dispenses liquid by gravity, and can be used in systems that dispense via pumps. In such systems, the determined liquid level can be used to trigger other events and indications, such as to automatically prevent any further dispensing operations when the liquid level in the tank drops below a predetermined liquid level threshold by example.

There are several advantages which can be realized by the liquid dispensing apparatus with an integrated optical liquid height measuring system embodiments.

By assessing liquid level throughout the dispensing process from a number of dispensed volumes/shots, the system can be configured to estimate the liquid level that should be changing over time. The system can then detect important discrepancies between the measured level through ratios of signals from the light sensors and this assessed level from number of dispensed shots. For example, if the liquid height measuring system consistently reports the same liquid level height over a predetermined number of shots, then an alarm can be issued to have an operator to perform a checkup of the tank, which may require a change in the tank or a cleaning of the tank. This could occur when a dairy product such as 10% cream is frozen on the surface of the tank wall where the light sensors are positioned. Because it is a dairy residue, it is important to detect this situation early to prevent the production of bacterial contamination by pathogens.

In the present embodiments, the tank can be easily removed from and reinserted to the container as there are no electronic elements connected to it. This improves the mechanical robustness of the system as there is no possibility of connectors and wires wearing out or being damaged through the repeated insertion and removal of the tank.

If the light sensors are installed at the back of the container and the dispensing nozzle is at the front of the container, the calibration and measurements can be configured to take into account any inclination of the tank from front to back and inversely. The correction cannot work based only on the offset that is introduced on the liquid level by the inclination between the back and front of the tank. In fact, the inclination also introduces some changes in the calibration, since part of the signal on the light sensors can come from reflections at the liquid surface and this is affected by the orientation of the liquid surface with respect to the light source and light sensor positions. This can be taken into account through calibrations performed at the factory at multiple known inclination values and through interpolation of the inclination measured on-site with respect to ones obtained at the factory. Also, it would be possible to measure the inclination in an automated manner using an inclinometer installed with a mechanically referenced inclination with respect to the tank or container. This would provide the system with a continuous auto-correction capability if the inclination from that inclinometer is periodically monitored by the processing system or the like. If the detectors are installed at the front of the dispenser, then some corrections may also be needed through calibrations performed at different inclinations because of the different reflections occurring at the liquid surface.

The dairy product level can be measured with an accuracy of 1 to 5 mm, which depends on the number of detectors that are used. As an example, this accuracy is possible using only 5 detectors covering a tank having a height of 25 to 30 cm. This means that the obtained accuracy on the measured level can be in the range of one tenth to one fiftieth of the distance between the detectors.

The space required to install the components of the optical liquid measurement system is minimal and does not require important mechanical modifications of the dispenser, thus allowing for simplified retrofitting operations.

Having only one light source and few light sensors reduces the component costs and data acquisition complexity of the optical liquid measurement system.

The optical liquid measurement system is relatively insensitive to the presence of water condensation and frosting on the wall and lid of the tank of the dispenser.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method for approximating liquid height in a tank in a container using light sensors arranged along a vertical direction of the container proximate the tank and prestored sets of calibrated signal values of the light sensors corresponding to known discrete levels of the liquid height, comprising:

activating a light source within the container;

generating an electrical signal value from each of at least two light sensors in response to light sensed by each of the at least two light sensors to form a set of measured electrical signal values;

accessing the prestored sets of calibrated signal values from a memory, where each prestored set of calibrated signal values includes a calibrated signal value for each of the at least two light sensors that corresponds to one discrete level of the liquid height;

determining one prestored set of calibrated values nearest to the set of measured electrical signal values by calculating differences between the calibrated signal value and a signal value corresponding to a measured electrical signal value for each of the at least two sensors for different known discrete levels of the liquid height, and identifying the one prestored set of calibrated values with a minimum sum of differences relative to the set of signal values; and outputting a discrete level of the liquid height corresponding to the one prestored set of calibrated values as the approximate liquid height in the tank on a display.

2. The method of claim 1, wherein the steps of activating, generating, accessing, executing and outputting occur in response to activation of a reset operation.

3. The method of claim 1, wherein the light source is activated followed by activation of the at least two light sensors after a predetermined delay.

4. The method of claim 1, wherein the light source and the at least two light sensors are activated concurrently, and the step of determining is initiated after a predetermined delay.

5. The method of claim 1, further including dispensing a volume of liquid from the tank in response to a selection from a user interface, after outputting the discrete level.

6. The method of claim 5, wherein the step of determining occurs in response to the selection.

7. The method of claim 1, wherein one of the at least two light sensors is a reference sensor positioned above a maximum liquid height in the tank.

8. The method of claim 7, wherein the step of determining includes converting the measured electrical signal value from each of the at least two light sensors other than the reference sensor into the signal value, the signal value being a corresponding measured ratio relative to the reference sensor electrical signal value.

9. The method of claim 8, wherein the step of determining includes
  summing for each prestored set, a difference value between the measured ratio and a calibrated ratio for each of the at least two light sensors other than the reference sensor, the calibrated ratio being a calibrated signal value of a light sensor relative to the reference sensor calibrated signal value of the same set, and
  identifying the one prestored set having the lowest absolute value sum as being nearest to the set of signal values.

10. The method of claim 9, wherein the step of determining includes multiplying each difference value by a weighting factor corresponding to that light sensor.

11. The method of claim 8, wherein the step of determining includes converting the prestored calibrated signal value for each of the at least two light sensors other than the reference sensor of a set, into the corresponding measured ratio.

12. The method of claim 8, wherein the calibrated signal values are calibrated ratios of the calibrated signal value relative to the reference sensor calibrated signal value of the same set.

13. A liquid height measuring system, comprising:
a tank with light permeable side walls and a light permeable lid for storing a specific liquid, and having a port for dispensing the specific liquid;
a container to enclose the tank;
a light source attached to a ceiling of the container for emitting light towards the tank;
at least two light sensors positioned on a side wall of the container along a vertical direction and proximate to the side wall, each of the at least two light sensors sensing an intensity of light and each generating a corresponding electrical signal value to form a set of measured electrical signal values;
a memory storing sets of calibrated signal values and corresponding known discrete levels of the liquid height, where each set of calibrated signal values includes a calibrated signal value for each of the at least two light sensors, corresponding to one of the known discrete levels of the liquid height; and
a processing system for receiving the set of measured electrical signal values and configured to determine one set of calibrated signal values nearest to the set of measured electrical signal values by calculating differences between the calibrated signal value and a signal value corresponding to a measured electrical signal value for each of the at least two sensors for different known discrete levels of the liquid height, and identifying the one set of calibrated values with a minimum sum of differences relative to the set of signal values, the processing system being further configured to output a discrete level of the liquid height corresponding to the one set of calibrated signal values.

14. The liquid height measuring system of claim 13, wherein one of the at least two light sensors is a reference sensor positioned above a maximum liquid height in the tank.

15. The liquid height measuring system of claim 14, wherein the processing system is configured to convert the measured electrical signal value from each of the at least two light sensors other than the reference sensor into the signal value, the signal value being a corresponding measured ratio relative to the reference sensor electrical signal value.

16. The liquid height measuring system of claim 15, wherein the processing system is configured to
sum for each prestored set, a difference value between the measured ratio and a calibrated ratio for each of the at least two light sensors other than the reference sensor, the calibrated ratio being a calibrated signal value of a light sensor relative to the reference sensor calibrated signal value of the same set, and
identifying the one prestored set having the lowest absolute value sum as being nearest to the set of signal values.

17. The liquid height measuring system of claim 16, wherein the processing system is configured to multiply each difference value by a weighting factor corresponding to that light sensor.

18. The liquid height measuring system of claim 16, further including a user interface system having a display to output the discrete level of the liquid height corresponding to the one set of calibrated signal values.

19. The liquid height measuring system of claim 13, wherein the at least two light sensors are mounted to a prefabricated structure.

20. The liquid height measuring system of claim 19, wherein the prefabricated structure includes analog to digital conversion circuitry for converting electrical signals from each of the at least two light sensors into corresponding electrical signal values.

21. The liquid height measuring system of claim 19, wherein the prefabricated structure includes at least one heating element positioned adjacent to each of the at least two light sensors.

22. The method of claim 1, wherein the signal value is the measured electrical signal value.

* * * * *